(12) United States Patent  (10) Patent No.: US 8,660,581 B2
Davis et al.  (45) Date of Patent: Feb. 25, 2014

(54) MOBILE DEVICE INDOOR NAVIGATION

(75) Inventors: Bruce L. Davis, Lake Oswego, OR (US); Tony F. Rodriguez, Portland, OR (US); Shankar Thagadur Shivappa, Beaverton, OR (US)

(73) Assignee: Digimarc Corporation, Beaverton, OR (US)

( * ) Notice: Subject to any disclaimer, the term of this patent is extended or adjusted under 35 U.S.C. 154(b) by 0 days.

(21) Appl. No.: 13/195,715

(22) Filed: Aug. 1, 2011

(65) Prior Publication Data

US 2012/0214515 A1  Aug. 23, 2012

Related U.S. Application Data

(63) Continuation-in-part of application No. 13/033,372, filed on Feb. 23, 2011.

(51) Int. Cl.
*H04W 4/02* (2009.01)

(52) U.S. Cl.
USPC .......................... 455/456.3; 367/118; 705/35

(58) Field of Classification Search
USPC ................. 455/404.1–404.2, 414.1–414.4, 455/456.1–457; 342/450–465; 705/26.1–29, 14.1–14.73, 319
See application file for complete search history.

(56) References Cited

U.S. PATENT DOCUMENTS

| | | | |
|---|---|---|---|
| 6,356,905 B1 * | 3/2002 | Gershman et al. | 705/26.8 |
| 7,739,705 B2 | 6/2010 | Lee et al. | |
| 2003/0215110 A1 | 11/2003 | Rhoads et al. | |
| 2004/0111320 A1 * | 6/2004 | Schlieffers et al. | 705/16 |
| 2004/0128514 A1 | 7/2004 | Rhoads | |
| 2008/0104227 A1 * | 5/2008 | Birnie et al. | 709/224 |
| 2009/0262975 A1 | 10/2009 | Rhoads et al. | |
| 2010/0134278 A1 | 6/2010 | Srinivasan et al. | |
| 2010/0199296 A1 * | 8/2010 | Lee et al. | 725/14 |
| 2010/0280826 A1 * | 11/2010 | Bakish | 704/226 |
| 2010/0322035 A1 * | 12/2010 | Rhoads et al. | 367/118 |
| 2011/0019999 A1 * | 1/2011 | George et al. | 398/58 |
| 2011/0028160 A1 | 2/2011 | Roeding et al. | |
| 2011/0029359 A1 | 2/2011 | Roeding et al. | |
| 2011/0029360 A1 * | 2/2011 | Gollapalli | 705/14.1 |
| 2011/0029362 A1 | 2/2011 | Roeding et al. | |
| 2011/0029364 A1 | 2/2011 | Roeding et al. | |
| 2011/0029370 A1 | 2/2011 | Roeding et al. | |
| 2011/0054890 A1 | 3/2011 | Ketola et al. | |
| 2011/0161076 A1 | 6/2011 | Davis et al. | |
| 2012/0165046 A1 | 6/2012 | Rhoads et al. | |

OTHER PUBLICATIONS

Rishabh, "Indoor Localization Using Controlled Ambient Sounds", 2012 International Conference on Indoor Positioning and Indoor Navigation, Nov. 13-15, 2012, 10 pages.

(Continued)

*Primary Examiner* — Kashif Siddiqui
(74) *Attorney, Agent, or Firm* — Digimarc Corporation

(57) ABSTRACT

A method for indoor navigation in a venue derives positioning of a mobile device based on sounds captured by the microphone of the mobile device from the ambient environment. It is particularly suited to operate on smartphones, where the sounds are captured using microphone that captures sounds in a frequency range of human hearing. The method determines a position of the mobile device in the venue based on identification of the audio signal, monitors the position of the mobile device, and generates a position based alert on an output device of the mobile device when the position of the mobile device is within a pre-determined position associated with the position based alert.

35 Claims, 9 Drawing Sheets

(56) References Cited

OTHER PUBLICATIONS

Mandal, "Beep: 3D Indoor Positioning Using Audible Sound", IEEE Consumer Communications and Networking Conference (CCNC'05), Las Vegas, Jan. 2005, 7 pages.

F. Blackmon and J. Pollock, "Blue Rose Perimeter Defense and Security System," Technologies for Homeland Security and Homeland Defense V, Proceedings of SPIE, vol. 6201, pp. 620123, 2006.

Indoor Navigation System for Handheld Devices, Manh Hung V. Le, Dimitris Saragas, and Nathan Webb, Oct. 22, 2009.

U.S. Appl. No. 13/033,372 Office Action dated Jun. 25, 2013.

International Search Report and Written Opinion in PCT/US12/026361 dated Jun. 28, 2012.

* cited by examiner

MOBILE DEVICE INDOOR NAVIGATION

RELATED APPLICATION DATA

This application is a continuation in part of U.S. patent application Ser. No. 13/033,372, filed Feb. 23, 2011, which is incorporated by reference in its entirety.

TECHNICAL FIELD

The invention relates to positioning systems and use of positioning for navigation and location based services.

BACKGROUND AND SUMMARY

Audio source localization uses one or more fixed sensors (microphones) to localize a moving sound source. The sound source of interest usually is a human voice or some other natural source of sound.

Reversing this scenario, sound signals transmitted from known locations can be used to determine the position of a moving sensor (e.g., a mobile device with a microphone) through the analysis of the received sounds from these sources. At any point of time, the relative positioning/orientation of the sources and sensors can be calculated using a combination of information known about the sources and derived from the signals captured in the sensor or a sensor array.

While traditional Global Positioning System (GPS) technologies are finding broad adoption in a variety of consumer devices, such technologies are not always effective or practical in some applications. Audio signal-based positioning can provide an alternative to traditional GPS because audio sources (e.g., loudspeakers) and sensors (e.g., microphones on mobile devices) are ubiquitous and relatively inexpensive, particularly in application domains where traditional GPS is ineffective or not cost effective. Applications of this technology include indoor navigation, in-store browsing, games and augmented reality.

Audio based positioning holds promise for indoor navigation because sound systems are commonly used for background sound and public address announcements, and thus, provide a low cost infrastructure in which a positioning network can be implemented. Audio based positioning also presents an alternative to traditional satellite based GPS, which is not reliable indoors. Indoor navigation enabled on a mobile handset enables the user to locate items in a store or other venue. It also enables navigation guidance to the user via the mobile handset via directions and interactive maps presented on the handset.

Audio based positioning also enables in-store browsing based on user location on mobile handsets. This provides benefits for the customer, who can learn about products at particular locations, and for the store owner, who can gather market intelligence to better serve customers and more effectively configure product offerings to maximize sales.

Audio based positioning enables location based game features. Again, since microphones are common on mobile phones and these devices are increasingly used as game platforms, the combination of audio based positioning with game applications provides a cost effective way to enable location based features for games where other location services are unreliable.

Augmented reality applications use sensors on mobile devices to determine the position and orientation of the devices. Using this information, the devices can then "augment" the user's view of surrounding area with synthetically generated graphics that are constructed using a spatial coordinate system of the neighboring area constructed form the devices location, orientation and possible other sensed context information. For example, computer generated graphics are superimposed on a representation of the surrounding area (e.g., based on video captured through the device's camera, or through an interactive 2D or 3D map constructed from a map database and location/orientation of the device).

Though audio positioning systems hold promise as an alternative to traditional satellite based GPS, many challenges remain in developing practical implementations. To be a viable low cost alternative, audio positioning technology should integrate easily with typical consumer audio equipment that is already in use in environments where location based services are desired. This constraint makes systems that require the integration of complex components less attractive.

Another challenge is signal interference and degradation that makes it difficult to derive location from audio signals captured in a mobile device. Signal interference can come from a variety of sources, such as echoes/reverberation from walls and other objects in the vicinity. Data signals for positioning can also encounter interference from other audio sources, ambient noise, and noise introduced in the signal generation, playback and capture equipment.

Positioning systems rely on the accuracy and reliability of the data obtained through analysis of the signals captured from sources. For sources at fixed locations, the location of each source can be treated as a known parameter stored in a table in which identification of the signal source indexes the source location. This approach, of course, requires accurate identification of the source. Positioning systems that calculate position based on time of arrival or time of flight require synchronization or calibration relative to a master clock. Signal detection must be sufficiently quick for real time calculation and yet accurate enough to provide position within desired error constraints.

Positioning systems that use signal strength as a measure of distance from a source require reliable schemes to determine the signal strength and derive a distance from the strength within error tolerances of the application.

These design challenges can be surmounted by engineering special purpose equipment to meet desired error tolerances. Yet such special purpose equipment is not always practical or cost effective for wide spread deployment. When designing a positioning system for existing audio playback equipment and mobile telephone receivers, the signal generation and capture processes need to be designed for ease of integration and to overcome the errors introduced in these environments. These constraints place limits on the complexity of equipment that is used to introduce positioning signals. A typical configuration is comprised of conventional loudspeakers driven by conventional audio components in a space where location based services add value and other forms of GPS do not work well, such as indoor shopping facilities and other public venues.

The audio playback and microphone capture in typical mobile devices constrain the nature of the source signal. In particular, the source signal must be detectable from an ambient signal captured by such microphones. As a practical matter, these source signals must be in the human audible frequency range to be reliably captured because the frequency response of the microphones on these devices is tuned for this range, and in particular, for human speech. This gives rise to another constraint in that the source audio signals have to be tolerable to the listeners in the vicinity. Thus, while there is some flexibility in the design of the audio signal sources, they must be tolerable to listeners and they must not interfere with other purposes of the audio playback equipment, such as to provide background music, information messages to shoppers, and other public address functions.

Digital watermarking presents a viable option for conveying source signals for a positioning system because it enables integration of a data channel within the audio programming played in conventional public address systems. Digital watermarks embed data within the typical audio content of the system without perceptibly degrading the audio quality relative to its primary function of providing audio programming such as music entertainment and speech. In addition, audio digital watermarking schemes using robust encoding techniques can be accurately detected from ambient audio, even in the presence of room echoes and noise sources.

Robustness is achieved using a combination of techniques. These techniques include modulating robust features of the audio with a data signal (below desired quality level from a listener perspective) so that the data survives signal degradation. The data signal is more robustly encoded without degrading audio quality by taking human auditory system into account to adapt the data signal to the host content. Robust data signal coding techniques like spread spectrum encoding and error correction improve data reliability. Optimizing the detector through knowledge of the host signal and data carrier enable weak data signal detection, even from degraded audio signals.

Using these advances in robust watermarking, robust detection of audio watermarks is achievable from ambient audio captured through the microphone in a mobile device, such as a cell phone or tablet PC. As a useful construct to design audio watermarking for this application, one can devise the watermarking scheme to enhance robustness at two levels within the signal communication protocol: the signal feature modulation level and the data signal encoding level. The signal feature modulation level is the level that specifies the features of the host audio signal that are modified to convey an auxiliary data signal. The data signal encoding level specifies how data symbols are encoded into a data signal. Thus, a watermarking process can be thought of as having two layers of signal generation in a communication protocol: data signal formation to convey a variable sequence of message symbols, and feature modulation to insert the data signal into the host audio signal. These protocol levels are not necessarily independent. Some schemes take advantage of feature analysis of the host signal to determine the feature modification that corresponds to a desired data symbol to be encoded in a sequence of message symbols. Another consideration is the use of synchronization and calibration signals. A portion of the data signal is allocated to the task of initial detection and synchronization.

When designing the feature modulation level of the watermarking scheme for a positioning application in mobile devices, one should select a feature modulation that is robust to degradation expected in ambient capture. Robust audio features that are modulated with an auxiliary data signal to hide the data in a host audio program in these environments include features that can be accumulated over a detection window, such as energy at frequency locations (e.g., in schemes that modulate frequency tones adapted using audio masking models to mask audibility of the modulation). The insertion of echoes can also be used to modulate robust features that can be accumulated over time, like autocorrelation. This accumulation enables energy from weak signals to be added constructively to produce a composite signal from data can be more reliably decoded.

When designing the data signal coding level for a positioning application, one should consider techniques that can be used to overcome signal errors introduced in the context of ambient capture. Spread spectrum data signal coding (e.g., direct sequence and channel hopping), and soft decision error correction improve robustness and reliability of audio watermarks using these modulation techniques. Direct sequence spread spectrum coding spreads a message symbol over a carrier signal (typically a pseudorandom carrier) by modulating the carrier with a message symbol (e.g., multiplying a binary antipodal carrier by 1 or −1 to represent a binary 1 or 0 symbol). Alternatively, a symbol alphabet can be constructed using a set of fixed, orthogonal carriers. Within the data signal coding level, additional sub-levels of signal coding can be applied, such as repetition coding of portions of the message, and error correction coding, such as convolution coding and block codes. One aspect of data signal coding that is directly related to feature modulation is the mapping of the data signal to features that represent candidate feature modulation locations within the feature space. Of course, if the feature itself is a quantity calculated from a group of samples, such as time segment of an audio clip, the feature modulation location corresponds to the group of samples and the feature of that group.

One approach is to format a message into an encoded data signal packet comprising a set of encoded symbols, and then multiplex packets onto corresponding groups of feature modulation locations. The multiplexing scheme can vary the mapping over time, or repeat the same mapping with each repetition of the same packet.

The designer of the data encoding scheme will recognize that there is interplay among the data encoding and mapping schemes. For example, elements (e.g., chips) of the modulated carrier in a direct sequence spread spectrum method are mapped to features in a fixed pattern or a variable scattering. Similarly, one way to implement hopping is to scatter or vary the mapping of encoded data symbols to feature modulation locations over the feature space, which may be specified in terms of discrete time or frequencies.

Robust watermark readers exploit these robustness enhancements to recover the data reliably from ambient audio capture through a mobile device's microphone. The modulation of robust features minimizes the impact of signal interference on signal degradation. The reader first filters the captured audio signal to isolate the modulated features. It accumulates estimates of the modifications made to robust features at known feature modulation locations. In particular, it performs initial detection and synchronization to identify a synchronization component of the embedded data signal. This component is typically redundantly encoded over a detection window so that the embedded signal to noise ratio is increased through accumulation. Estimates are weighted based on correspondence with expected watermark data (e.g., a correlation metric or count of detected symbols matching expected symbols). Using the inverse of the mapping function, estimates of the encoded data signal representing synchronization and variable message payload are distinguished and instances of encoded data corresponding to the same encoded message symbols from various embedding locations are aggregated. For example, if a spreading sequence is used, the estimates of the chips are aggregated through demodulation with the carrier. Periodically, buffers storing the accumulated estimates of encoded data provide an encoded data sequence for error correction decoding. If valid message payload sequences are detected using error detection, the message payload is output as a successful detection.

While these and other robust watermarking approaches enhance the robustness and reliability in ambient capture applications, the constraints necessary to compute positioning information present challenges. The positioning system preferably should be able to compute the positioning information quickly and accurately to provide relevant location and/or device orientation feedback to the user as he or she moves. Thus, there is a trade-off between robustness, which tends toward longer detection windows, and real time response, which tends toward a shorter detection window. In addition, some location based techniques based on relative time of arrival rely on accurate synchronization of source signal transmissions and the ability to determine the difference in arrival of signals from different sources.

Alternative approaches that rely on strength of signal metrics can also leverage watermarking techniques. For example, the strength of the watermark signal can be an indicator of distance from a source. There are several potential ways to design watermark signals such that strength measurements of these signals after ambient capture in a mobile device can be translated into distance of the mobile device from a source. In this case, the watermarks from different sources need to be differentiated so that the watermark signal from each can be analyzed.

The above approaches take advantage of the ability to differentiate among different sources. One proposed configuration to accomplish this is to insert a unique watermark signal into each source. This unique signal is assigned to the source and source location in a database. By identifying the unique signal, a positioning system can determine its source location by finding it in the database. This approach potentially increases the implementation cost by requiring additional circuitry or signal processing to make the signal unique from each source. For audio systems that comprise several speakers distributed throughout a building, the cost of making each signal unique yet and reliably identifiable can be prohibitive for many applications. Thus, there is a need for low cost means to make a source or a group of neighboring sources unique for the purpose of determining where a mobile device is within a network of sources.

Digital watermarks can be used to differentiate streams of audio that all sound generally the same. However, some digital watermark signaling may have the disadvantage that the host audio is a source of interference to the digital watermark signal embedded in it. Some forms of digital watermarking use an informed embedding in which the detector does not treat the host as interfering noise. These approaches raise other challenges, particularly in the area of signal robustness. This may lead the signal designer to alternative signaling techniques that are robust techniques for conveying source identification through the audio being played through the audio playback system.

One alternative is to use a form of pattern recognition or content fingerprinting in which unique source locations are associated with unique audio program material. This program material can be music or other un-obtrusive background sounds. To differentiate sources, the sounds played through distinct sources are selected or altered to have distinguishing characteristics that can be detected by extracting the unique characteristics from the received signal and matching them with a database of pre-registered patterns stored along with the location of the source (or a neighborhood area formed by a set of neighboring sources that transmit identical sounds). One approach is to generate unique versions of the same background sounds by creating versions from a master sound that have unique frequency or phase characteristics. These unique characteristics are extracted and detected by matching them with the unique characteristics of a finite library of known source signals.

The approaches of inserting a digital watermark or generating unique versions of similarly sounding audio share some fundamental principles in that the task is to design a signaling means in which sources sound the same, yet the detector can differentiate them and look up locations parameters associated with the unique signal payload or content feature pattern. Hybrid approaches are also an option. One approach is to design synthetic signals that convey a digital payload like a watermark, yet are themselves the background sound that is played into the ambient environment of a building or venue where the audio based positioning system is implemented. For example, the data encoding layer of a watermark system can be used to generate data signal that is then shaped or adapted into a pleasing background sound, such as the sound of a water feature, ocean waves or an innocuous background noise. Stated another way, the data signal itself is selected or altered into a form that has some pleasing qualities to the listener, or even simulates music. Unique data signals can be generated from structured audio (e.g., MIDI representations) as distinct collections of tones or melodies that sound similar, yet distinguish the sources.

One particular example of a system for producing "innocuous" background sound is a sound masking system. This type of system adds natural or artificial sound into an environment to cover up unwanted sound using auditory masking. White noise generators are form of sound masking system that uses a white noise type audio signal to mask other sounds. One supplier of these types of systems is Cambridge Sound Management, LLC, of Cambridge, Mass. In addition to providing sound masking, these systems include auxiliary inputs for paging or music distribution. The system comprises control modules that control zones, each having zone having several speakers (e.g., the module independently controls the volume, time of day masking, equalization and auto-ramping for each zone). Each control modules is configurable and controllable via browser based software running on a computer that is connected to the module through a computer network or direct connection.

Another hardware configuration for generating background audio is a network of wireless speakers driven by a network controller. These systems reduce the need for wired connections between audio playback systems and speakers. Yet there is still a need for a cost effective means to integrate a signaling technology that enables the receiver to differentiate sources that otherwise would transmit the same signals.

In this disclosure, we describe methods and systems for implementing positioning systems for mobile devices. There is a particular emphasis on using existing signal generation and capture infrastructure, such as existing audio or RF signal generation in environments where traditional GPS is not practical or effective.

One method detailed in this disclosure is a method of determining position of a mobile device. In this method, the mobile device receives audio signals from two or more different audio sources via its microphone. The audio signals are integrated into the normal operation of an audio playback system that provides background sound and public address functionality. As such, the audio signals sound substantially similar to a human listener, yet have different characteristics to distinguish among the different audio sources. The audio signals are distinguished from each other based on distinguishing characteristics determined from the audio signals. Based on identifying particular audio sources, the location of the particular audio sources is determined (e.g., by finding the coordinates of the source corresponding to the identifying characteristics). The position of the mobile device is determined based on the locations of the particular audio sources.

Particular sources can be identified by introducing layers of unique signal characteristics, such as patterns of signal alterations, encoded digital data signals, etc. In particular, a first layer identifies a group of neighboring sources in a network, and a second layer identifies a particular source. Once the sources are accurately distinguished, the receiver then looks up the corresponding source coordinates, which then feed into a position calculator. Position of the mobile device is then refined based on coordinates of the source signals and other attributes derived from the source signals.

Additional aspects of the invention include methods for generating the source signals and associated positioning systems.

These techniques enable a variety of positioning methods and systems. One such system determines location based on source device location and relative time of arrival of signals from the sources. Another determines location based on relative strength of signal from the sources. For example, a source with the strongest signal provides an estimate of position of the mobile device. Additional accuracy of the location can be calculated by deriving an estimate of distance from source based on signal strength metrics.

The above-summarized methods are implemented in whole or in part as instructions (e.g., software or firmware for execution on one or more programmable processors), circuits, or a combination of circuits and instructions executed on programmable processors.

One aspect of the invention is a method for indoor navigation in a venue. This method derives positioning of a mobile device based on sounds captured by the microphone of the mobile device from the ambient environment. It is particularly suited to operate on smartphones, where the sounds are captured using microphone that captures sounds in a frequency range of human hearing (the human auditory range). Thus, while the capture range of the device may be broader, the method is designed to use existing sound capture on these devices. The method determines a position of the mobile device in the venue based on identification of the audio signal, monitors the position of the mobile device, and generates a position based alert on an output device of the mobile device when the position of the mobile device is within a pre-determined position associated with the position based alert.

This navigation method can be extended with a variety of features that support mapping of navigation paths in real time, displaying alternative paths, and deriving and generating navigation feedback from a variety of forms of input. This input can be direct from the user or other users through messaging, or indirect, where the input is inferred from contextual information. Examples include navigation based on shopping lists entered by the user, product recommendations from messaging systems, product preferences inferred from user context (such as transaction history, calendar of activities, etc.), and product preferences obtained from social networks. Navigation instructions in the form of paths in a venue such as a store may be computed in advance of a navigation session and updated in real-time during a session, with changing circumstances from the user's affinity group (social network posts or product tagging), changing user context, updated reminders from friends or family members, and changing conditions in the store, such as in-store promotions based on monitored traffic.

Aspects of the invention are implemented in mobile devices and in a network (e.g., cloud computing services offered on one or more server computers). As such, the invention encompasses methods, system and devices for navigation implemented in mobile devices, like wireless telephones, in network computing systems that provide location calculation, monitoring and navigation services, and in a combination of both. Implementations may be executed in one or more computers, including mobile devices and a network of servers in communication with the mobile devices.

For example, another aspect of the invention is a system for indoor navigation in a venue. The system comprises a configuration of audio sources, each transmitting a uniquely identifiable audio signal corresponding to a location. It also comprises one or more computers for receiving audio detection events from mobile devices in the venue. These detection events provide identifying information of audio sources in the venue. The computer (or computers) calculate mobile device location from the detection events, monitor position of the mobile devices at the venue, and send an alert to the mobile devices when the position of the mobile devices is at a position associated with the alert.

Additional aspects of the invention include methods implemented in instructions executing on mobile devices, server systems, or executing on a combination of both.

Further features will become apparent with reference to the following detailed description and accompanying drawings.

DETAILED DESCRIPTION

Sensor and Source Configurations

Before getting to the details of a particular localization approach, we start with a discussion of sensor and source configurations and an overview of location information that can be derived from each. In the case of audio localization, the sensors are microphones and the sources are audio transmitters (e.g., loudspeakers). Each can be present in many different configurations, and we review the main categories here. We are particularly interested in applications where the sensor is a common component of a consumer device that is popular among consumers, such as a mobile phone or tablet computer. As such, our examples of configurations use these devices. Later, we provide particular examples of the methods applicable to each of the configurations.

Configurations can be organized according to the three following categories: 1) the number of sources, 2) the number of microphones on the mobile device; and 3) the number of mobile devices collaborating with each other.

Figure 1:
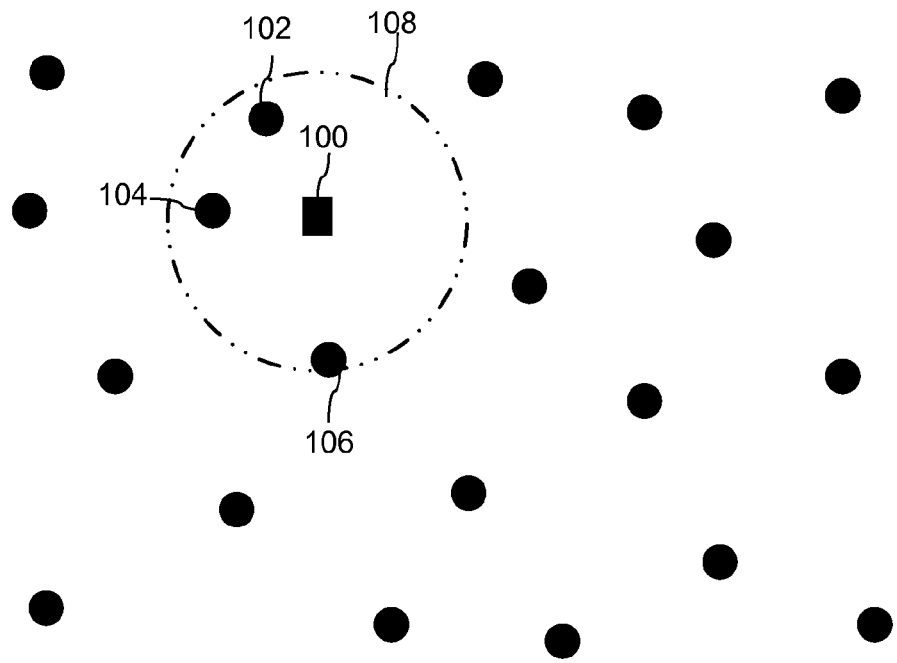
FIG. 1 is a diagram illustrating a mobile device in the midst of a network of signal sources.

To illustrate, we use a general example of a network of signal sources. FIG. 1 is a diagram illustrating a mobile device 100 in the midst of a network of signal sources (represented as dots, e.g., 102, 104 and 106). At a given position within the network of audio sources in FIG. 1, there is a subset of the network comprising one or more sources within the range of the mobile device. This range is depicted as a dashed circle 108.

One loudspeaker: A positioning system can be configured to detect or measure the proximity of the sensor to one source (e.g., such as the closest source). Even within a network of signal sources as shown in FIG. 1, the system can be reduced to a single source, e.g., 102, within the range of the mobile device 100. At a minimum, the mobile device knows that it is within the neighborhood of source 102. With additional information, such as the strength of signal or direction of the source, more position information can be computed and provided to the user of the mobile device.

Directional speakers can be used to provide a cone of sound in a particular location within a venue. For example, in positioning system adapted for a store, directional speakers are positioned within the ceiling in rows above the aisles between merchandise shelves in the store. The shelves provide sound conditioning to minimize overlap between the sounds emitted from speakers of different aisles. Within each aisle, the directional speakers project downward a cone of sound along an axis that is perpendicular to that of adjacent speakers. In this configuration, the identification of the sound source indicates that the mobile device that captured sound from that source is within its cone of sound. Additional sensors, such as the accelerometer, magnetometer, and/or gyroscope provide orientation information of the user's mobile device, and thus, indicate the shelves and merchandise on the shelves that is closest to the user's device and/or is located in a direction where the device is pointed or traveling toward.

Two or preferably more than two loudspeakers: Two or more speakers enable triangulation to estimate the relative position of the sensor. Referring to FIG. 1, sources 102, 104 and 106 are in the range of the mobile device 100. The relative arrival time of the audio signal from these sources to the mobile device provide sufficient data to determine location. For example, each pair of source to mobile device 100 within the range 108 provides input to a set of equations that can be solved to calculate a location. The relative arrival time to the mobile device from two different sources provides a location approximation of the mobile device along a hyperboloid. Adding another pair enables calculation of the mobile device as the intersection of the hyperboloids calculated for the two pairs. As the number of pairs of sources within range of the mobile device increase, the system can include them in the data used to calculate a solution. Also, the particular sources used are preferably vetted before data obtained from them is included according to signal metrics, such as signal strength of a detected embedded signal from the source.

This approach is sometimes referred to as multi-lateration or hyperbolic positioning. In this case, we locate a receiver by measuring the time difference of arrival (TDOA) of a signal from different transmitters. Phase difference of two transmitters can be used as well. With multiple transmitters, the TDOA approach is solved by creating a system of equations to find the 3D coordinates (e.g., x, y and z) of the receiver based on the known coordinates of each transmitter and the TDOA for each pair of transmitters to the receiver. This system of equations can then be solved using singular value decomposition (SVD) or Gaussian elimination. A least squares minimization can be used to calculate a solution to the receiver's position.

Additional assumptions simplify the calculation, such as assuming that the mobile device is on the ground (e.g., simplifying a 3D to a 2D problem), and using a map of the network site to limit the solution space of positions of a mobile device to particular discrete positions along paths where users are expected to travel. In the latter, rather than attempting to solve a system of equations with a SVD method, the system can step through a finite set of known positions in the neighborhood to determine which one fits the data best.

The accuracy of the calculations may dictate that the location is accurate within some error band (e.g., the intersection of two or more error bands along the two or more hyperboloids for corresponding two or more pairs of sources relative to the mobile device).

Another approach using two or more sources is to approximate distance from the source using strength of signal metrics that provide a corresponding distance within an error band from each source to the mobile device. For example, a watermark detection metric, such as correlation strength or degree of signal correspondence between detected and expected signals is used to approximate the distance of the source from the mobile device. The strength of signal is a function of the inverse square of the distance from the source. The strength of signals at higher frequencies decreases more quickly than lower frequencies. Strength of signal metrics that determine the relative strength of low to high frequency signals can be used to estimate distance from source. Accuracy may be improved by tuning the metrics for a particular source location and possible receiver locations that represent the potential position solution space for the positioning system. For instance, for a given installation, the relationship between a strength of signal metric and the distance from a particular sound source is measured and then stored in a look up table to calibrate the metric to acoustic properties at that installation.

One Microphone or closely spaced microphones: This is the state of typical mobile devices, and as such, they are not suited to perform direction of arrival estimation as in the case of microphone arrays.

Microphone Array with two or more microphones: Using a microphone array to provide direction of arrival of a sound is practical in devices such as tablet PCs that have the required physical dimensions to accommodate the microphone array. With such an array, the localization method can identify the direction of the sound source relative to the orientation of the receiving device and enable better triangulation schemes. This direction information simplifies the calculation of the receiver's position to finding the point along a line through the source and receiver where the receiver is located. When the receiver can determine direction and orientation relative to two or more sources, the positioning system computes position as the intersection of these lines between the receiver and each source. With the orientation provided by a microphone array, one can enable mapping applications (e.g., display a map showing items in an orientation based on the direction of where the user is headed).

In addition to array of microphones, the system can also exploit data from additional sensors, such as the camera, accelerometer and magnetometer to provide orientation/direction of the device and direction of the path of travel of the mobile device through the network.

In order to determine the direction of a distinct source among two or more sources, the system first identifies the unique sources. The signal properties of each unique source signal than are used to filter the source signal to isolate the signal from a particular source. For example, a matched filer is used to isolate the received signal from a particular source. Then, the system uses microphone array processing to determine the direction of that isolated signal. This microphone array processing detects relative phase delay between the isolated signals from the different microphones in the array to provide direction of arrival relative to the orientation of the array.

In one embodiment, the source signal is unique as a result of direct sequence spread spectrum watermark that is added to the host audio signal. A correlation detector detects the carrier signal and then isolates the watermark signal. The phase delays between pairs of carrier signals detected from each microphone are then used to determine direction of arrival.

Single mobile device: This is a scenario in which a single mobile device captures distinct audio from one or more sources and derives localization from data that it derives from this captured audio about the source(s) such as source identity, location, direction, signal strength and relative characteristics of signals captured from different sources.

Multiple mobile devices: In this scenario, localization of the sources may be enhanced by enabling the devices to collaborate with each other when they are in the vicinity of each other. This collaboration uses a wireless communication protocol for exchange of information among devices using known means of inter-device communication between neighboring devices (e.g., Bluetooth, Wi-Fi standard, etc.).

Having reviewed various configurations, we now turn to a description of audio signal positioning systems. One scheme, from which many variants can be derived, is to configure a space with loudspeakers that continuously play some identifiable sound. The microphone(s) on the mobile device capture this audio signal, identify the source, and determine the relative proximity/positioning of the source.

Within this type of configuration, there are three main aspects to consider: 1. The means to identify the sound source; 2. The means to perform ambient detection of signals from the source (e.g., ambient refers to capture of ambient sounds through a microphone); and 3. The means to determine sound source proximity and position estimation.

1. Identifiable Sound Source

Existing sound source localization schemes focus on locating the dominant sound sources in the environment. In contrast, we need the ability to locate specific (maybe non-dominant) sound sources, even in the presence of other sources of sound in the neighborhood. One way to achieve this is to look for the presence of an encoded data signal (e.g., such as a non-audible digital watermark; or data signal constructed to be tolerable as background sound). Another way is to use a content fingerprinting technique to recognize a specific sound source as being present in the neighborhood of the mobile device. The sound sources can be directional speakers, and can be installed within ceiling, walls, or shelf structures with additional sound conditioning structures to shape the region of sound emanating from the sound source. The sound sources can be special purpose or portable devices with audio transducers that are positioned within objects like shelving or end-cap promotional displays (e.g., shelf talker devices). The sound sources can be wired from a power source or powered locally by battery. The sound sources can also be driven from a centralized audio source, or de-centralized such that each sound source or a small group of sources is driven by a different source, potentially by an audio output source, like a digital audio player device including flash memory, compressed audio decoder, digital-to-analog converter, audio output driver and audio output transducer.

The degrees of freedom of motion of the mobile device may also be constrained to improve the consistency and quality of audio capture from particular audio sources, as well as simplify the calculation of mobile device position. In indoor shopping applications, a cradle for the user's mobile device can be placed on a shopping cart. The cradle holds the smartphone handset in a fixed position on the cart, while enabling the user to view its display in hands free operating mode. In addition to enabling hands free, autonomous operating mode of the location-based services, the cradle reduces the solution space for position and orientation of the device. Additional features of cradle based systems are discussed further below.

2. Ambient Detection of the Source

We need to ensure that the embedded signals used to convey information within the audio signal (e.g., digital watermark or synthesized sound conveying data within the audio source signal) can be recovered reliably from ambient captured audio, especially in noisy environments such as in a shopping mall. One way to increase robustness of a digital watermark, among others, is to sense the ambient "noise" level and adjust the watermark strength embedded in the transmitted signals in real-time so that detection is reliable.

3. Sound Source Proximity/Position Estimation

After the source is identified, the proximity information is estimated. If microphone arrays are available on the mobile device, the relative direction of the source is determined from the microphone array. One approach described further below is to use strength of signal metrics such as metric that measures watermark signal degradation of a combination of robust and fragile digital watermarks. This metric is then provided to a look up table to translate it into an estimate of the distance from the source to the microphone. For example in one implementation, watermarks are embedded at different robustness levels whose detection is dependent on distance from the source. As distance from the source decreases, the ability to recover watermarks at successively lower signal strength or robustness increases. The weakest watermark to be detected provides an indicator of distance from the source because the point at which the next weakest watermark is no longer detected corresponds to a distance from the source.

As another example, detection metrics of the embedded signal can be used to measure the strength of the signal from a particular source. In one implementation, an embedded digital watermark is encoded by modulating frequency tones at selected higher frequencies (e.g., higher frequencies still within the audible range of the microphone on a mobile device). The strength of these tones is attenuated as distance from the source grows. Thus, a detection metric such as the ratio of the high frequency tones to the low frequency tones of the embedded signal provides a detection metric that corresponds to a distance from the source.

In some applications, proximity from multiple sources might need to be estimated simultaneously, to allow for triangulation-based position estimation.

Below, we provide details of some alternative system implementations, including:
1. Different approaches to introduce a digital watermark into an audio stream;
2. Sensing ambient audio level and adjusting the watermark strength based on the psycho-acoustic modeling of the ambient audio level for real-time masking computation; and
3. A proximity estimation enabled watermarking scheme.

The ability to identify the source uniquely allows localization of a receiving device in the presence of background noise and other sources that might interfere with the source signals.

Initially, the localization method seeks to determine whether the mobile device being located is close to any relevant source.

We have devised a variety of methods for determining the closest source. These methods include a watermarking approach for arbitrary host content, a content fingerprinting approach using a defined set of audio source signals, and synthetic audio approach where audio is constructed to convey particular information.

Figure 2:
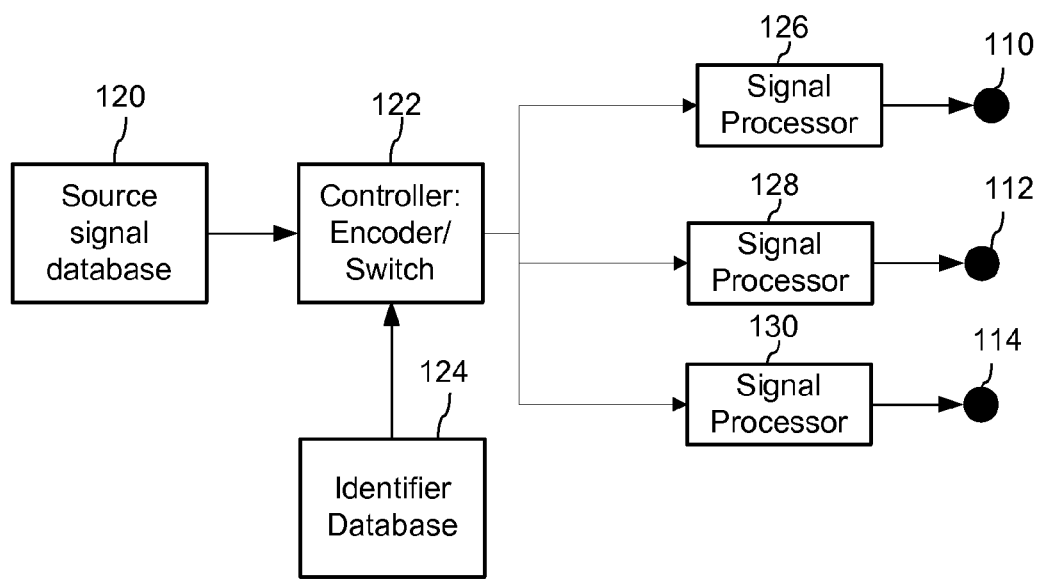
FIG. 2 is a diagram illustrating a system for generating unique audio source signals for use in a position system.

FIG. 2 is a block diagram illustrating a configurable system for generating unique audio signals within a network of audio sources. The task of this system is to generate unique signals from audio sources (e.g., loudspeakers 110, 112, 114) that are identified through analysis of ambient audio captured at a receiving device. Continuing the theme from FIG. 1, these loudspeakers are representative of the source nodes in a positioning network. Each one has an associated location that is registered with the system in an initialization stage at a venue where the positioning system is implemented. In some implementations, the source signals are adapted for the particular room or venue acoustics to minimize interference of echoes and other distortion. Further, as noted, the solution space for discrete positions of a mobile device within a particular venue can be mapped and stored in conjunction with the identifiers for the network nodes. This information is then fed to the position calculation system based on identification of the nodes from the received signals captured in a mobile device.

The strength of signal metrics for a received strength of signal system (RSS) are tuned based on taking signal measurements at discrete locations within the venue and storing the relationship between the value of one or more signal metrics for a particular source signal at the network node along with the corresponding distance from a source, which is identified through the source identifier(s) of the source signal(s) at that network location.

The system of FIG. 2 is preferably designed to integrate easily in typical audio equipment used to play background music or other programming or background sounds through a network of speakers at a venue. This audio equipment includes pre-amplifiers, audio playback devices (e.g., CD player or player of digital audio stream from a storage device), a receiver-amplifier and ultimately, the output speaker. As noted in the summary, these devices are preferably controllable via control modules that control the audio playback in zones and are each configurable and controllable through software executing on a remote computer connected to the controllers via a network connection.

In one implementation, each network location has a unique audio source from an audio output device that drives a loudspeaker for the location through a sound card for that location. The sound card has an audio input for the audio source, an audio output device, such as a white noise generator or audio player (e.g., CD-player or flash-memory digital audio player). Unique audio source signals can be played from the memory of the audio player, streamed to it from a network connection (e.g., Ethernet or wi-fi). Sound masking systems (including white noise generator systems) and public address systems can be designed in a de-centralized configuration where each one of one or a few speakers is driven by a different audio source. The audio output device providing that source can be co-located with the speaker or output transducer for a zone. The audio signal can be streamed through a wire or wireless connection to an output driver (e.g., amplifier device with input/output interfaces for analog/digital, wire and wireless I/O), and can be further streamed from such a device to a wire or wireless speaker. Sound masking systems from providers like Archoustics (Archoustics Mountain, Louisville, Colo.) offer sound masking units with de-centralized zones in which each zone has an independent audio source. Sound masking equipment, such as LogisSon technology, is manufactured by K.R. Moeller Associates, Ltd., Ontario, Canada. Of course, alternative configurations can be implemented using a combination of custom and off-the-shelf audio source, pre-amplifier, driver and output transducer components, with wire and wireless interfaces adapted for the particular application.

Audio processing to make unique audio source signals can be inserted at various points in the audio signal generation and transmission path. FIG. 2 shows several different options. First, the audio signal originates from a database 120. In a mode where the unique signal is generated by selecting a unique signal with corresponding unique fingerprint, or is generated as a synthetic audio signal conveying an identifier, the system has a controller that selects the unique audio signal for a particular source and sends that signal down a path to the loudspeaker for output. The role of an identifier database 124 in this case is to store an association between the unique signal fingerprints or payload of the synthetic signal with the corresponding source (e.g., loudspeaker) location. To simplify configuration of the system, the database can store a pointer to location parameters that are set when the loudspeaker locations are set. These parameters may also include other parameters that adapt the position calculation to a particular network location or source signal (such as a discrete set of position locations, strength of signal characteristics, unique source signal characteristics to aid in pre-filtering or detection, etc.).

In the case where a digital watermark signal stream is embedded to identify the location, the controller 122 includes a digital watermark embedder that receives the audio stream, analyzes it, and encodes the digital watermark signal according to an embedding protocol. This protocol specifies embedding locations within the feature space where one or more data signal layers are encoded. It also specifies format parameters, like data payload structure, redundancy, synchronization scheme, etc. In this type of implementation, the identifier database stores the association between the encoded source identifier and location of the source.

In a watermarking approach, each loudspeaker plays a uniquely watermarked sound. The controller 122 switches the uniquely watermarked audio signals onto the transmission paths of the corresponding speakers (e.g., 110, 112, 114).

Alternatively, if it is not practical to implement unique embedding for each loudspeaker, a set of loudspeakers within a neighborhood play the same watermarked signal, but they have additional signatures that enable the receiver to distinguish the source. For instance, using the example of FIG. 2, the controller sends the same audio signal to the transmission path of a subset of loudspeakers in a particular area of the building. Then, a signal processor (e.g., 126, 128, 130) within the transmission path of each particular source introduces a unique signature into the audio signal. This signature is stored in addition to the source identifier in the database 124 to index the particular location of the loudspeaker that receives the signature altered audio signal at the end of the transmission path.

Since the signal processors (e.g., 126, 128, 130) are needed for several locations in the network of audio sources, they are preferably inexpensive circuits that can be added in-line with the analog transmission path to each loudspeaker. For example, a tapped delay line circuit is connected in-line to introduce a unique set of echoes that is detectable at the receiver to distinguish the audio signals within the subset of sources of the network sharing the same identifier. One approach to construct a tapped delay line circuit is to use a bucket brigade device. This is a form of analog shift register constructed from an NMOS or PMOS integrated circuit.

The speakers in this area are assigned a neighborhood location. If no further position data can be derived at the receiver than the identity of the source, this neighborhood location can at least provide a position accurate to within an area defined as the proximity to the location of the speaker subset. If the signature is detectable from a dominant source, this detection from the dominant source provides a position accurate to within the proximity of the dominant source. Finally, when two more signatures are detected in the captured audio, then additional position calculations are enabled as explained previously based on TDOA, direction of arrival, triangulation, etc.

A multi-layered watermarking scheme enables a hierarchical scheme of identifying sources within a network. In such a scheme, a first encoded data signal identifies a first larger area of the source network (e.g., a circle encompassing a subset of network nodes that share the same top level identifier). Additional information extracted from the received signal provide additional metrics that narrow the location to a smaller set of sources, a particular source, a particular distance from the source, and finally a particular location within some error tolerance bubble. The simplest of this type of scheme is a two layered approach in which there two watermark layers from each source: a common watermark embedded in the signals output at by a set of speakers in a network (e.g., a set of speakers in a particular area that defines a local neighborhood for mobile devices in this area) and a lower level watermark that is easy to introduce and has a smaller payload, just enough to distinguish between the set of speakers. Techniques for this type of watermarking include: a direct sequence spread spectrum (DSSS) watermark, an echo based watermark, an amplitude or frequency modulation based watermark, and combinations of these methods, which are not mutually exclusive. As described further below, DSSS is used in one embodiment to formulate an encoded data signal, which then is used to modulate features of the signal, such as time and/or frequency domain samples according to a perceptual masking model. An echo based technique is also used to modulate autocorrelation (e.g., echo modulation detected at particular delays). A set of masked frequency tones is also used to encode a data signal onto host audio.

In one particular implementation, we designed a two layer watermark scheme as follows. For a first layer of watermark, a watermark encoder generates a DSSS data signal. The encoder then maps the encoded data chips to corresponding consecutive time blocks of audio to spread the signal over time. For the time portion corresponding to a particular chip, the data signal is adapted to the audio signal for that portion using an audio masking model. The perceptual adaption generates a particular adjustment for the audio signal in the time block to encode the corresponding chip. This can include frequency domain analysis to adapt the data signal to the audio based on frequency domain masking model. The chip signal may be conveyed in one band or spread over some frequency bands (e.g., spreading of the signal may be both in time and frequency). This first layer conveys an identifier of a portion of the network comprises a set of neighboring network nodes.

For a second layer, a signal processor introduces a distinct echo pattern into the audio signal to identify a particular source within the neighboring network nodes identified by the first layer.

The first layer reliability is enhanced by spreading the signal over time and averaging detection over a period of time encompassing several segments of the entire chipping sequence. This period can be around 1 to 5 seconds.

The second layer reliability is enhanced by using a distinct combination of echoes to represent a particular source within a subset of sources. A symbol alphabet is constructed from a combination of echoes within a maximum delay of 50 milliseconds. This maximum delay minimizes the perception of the echoes by humans, particularly given the ambient noise present in the applications where the positioning system is to be used. Each combination of echoes forms an echo pattern corresponding to a symbol. The source identifier in the second layer is formed from a set of one or more symbols selected from the alphabet.

Robustness is further enhanced by using a combination of strong echoes that are spaced apart (e.g., 5 milliseconds apart) and selected to minimize conflict with room echoes and other "non-data" echoes or noise sources. For example, the echo patterns used to distinguish sources from room effects have a time (combination of delays) and frequency configuration that is distinguishable from room echoes. The frequency configuration can be selected by selecting pre-determined echoes within pre-determined frequency bands (e.g., selected from a range of high, mid, low bands within a signal coding range selected to not be audible by humans, but still within audible capture range of a typical cell phone microphone).

Robustness and reliability is further enhanced by signal detector design. Detector design includes pre-filtering the signal to remove unwanted portions of the signal and noise. It also includes accumulating energy over time to improve signal to noise ratio. For example, a detector uses a series of correlators that measure the autocorrelation in the neighborhood of the predetermined discrete delays in the symbol alphabet. The energy accumulated over time at the pre-determined delays is evaluated to identify whether an echo pattern corresponding to a data symbol or symbols is present.

Preferably, the signal processor that introduces the second layer is an inexpensive circuit that is connected in line in the electrical path of the audio signal from the sound system amplifier to the loudspeaker. One implementation of such a circuit is the bucket brigade circuit described in this document. These circuits can be made to be configurable by selective turning on or adjusting the gain of the delay signals that are introduced into the audio signal passing through the device.

In one implementation, a detector uses Ceptrsal analysis to detect an embedded echo profile through ambient capture of audio through the microphone of a smartphone (namely, an Apple iPhone). This detector is software based, executing either on the smartphone or server in communication with it. Using an echo duration of 50 ms or greater, the detector detected the echo profile from ambient capture for distances up to 9 feet away from the loudspeaker. The nature of the host audio signal in which the echo profile was embedded did not have a strong impact on detection results. As such, this approach is adaptable to a variety of audio source signals typical in indoor public audio systems, like music, speech, sound masking noise (e.g., from a white noise generator for sound masking in public spaces), soothing background sounds like ocean waves, etc.). In this example, a digital audio delay circuit provided the echo profile.

The use of Cepstral analyses to detect the embedded profile signal takes advantages of features of a Cepstral transform from which a variety of optimized detector implementations may be derived. While the particular details of Cepstral analyses vary, they are based on a Cepstral transform, which includes taking the log of a frequency transform of the signal of interest (in this case, the digitized audio from the microphone). The Cepstral transform can be expressed as the inverse frequency transform of the log of the frequency transform of the signal. For example, using an FFT as the frequency transform, the Cepstral transform of discrete signal, $x(n)$, can be expressed as, $\hat{x}(n)=iFFT(\log(FFT(x(n)))$. Using a Cepstral transform, the convolution of two signals becomes equivalent to the sum of the Cepstra of the two signals.

Another feature of a Cepstral transform is that it enables the detector to detect echo profiles in host signal content. For example, averaging the Cepstra of an audio signal over time can separate echo components in the audio as echo components add constructively, while other components do not. If the host signal has zero mean in the Cepstral domain, as is typical with the host signals used in ambient audio (e.g., speech, music, designed signals for masking of sound or background sound), then the average host signal component goes to zero, leaving the echo profile. There are different methods of filtering Cepstra to detect an echo profile, generally referred to as "liftering," which is the Cepstral domain equivalent of filtering. These methods seek to combine constructively the echo components, such as through averaging or weighted averaging of Cepstrum magnitudes, squared magnitudes, squares of Cepstrum coefficients, etc. Echo profile detectors, thus, can be designed by averaging Cepstra of successive time frames of the digital ambient audio over which the echo profile is held constant.

An alternative way to implement the second layer is to introduce a set of frequency tones. These tones can be adjusted in amplitude according to audio masking models. One form of signal processor for inserting these tones is to add oscillator circuits at selected frequencies (e.g., three of four selected tones from a set of 10 predetermined tones). A composite signal is constructed by selecting a combination of oscillator outputs preferably high enough in the human auditory range to be less audible, yet low enough to be robust against ambient noise and other noise sources introduced through microphone capture. Also the selected tones must be reliably detected by the microphone, and thus, must not be distorted significantly in the microphone capture process.

Complementary detectors for this form of frequency modulation use filter banks around the pre-determined frequency tones. Energy at these frequencies is accumulated over time and then analyzed to identify a combination of tones corresponding to a predetermined identifier or data symbol.

Yet another way to differentiate a source or group of sources is to introduce a temporal perturbation or jitter. In this approach, time scale changes are applied to corresponding portions of an audio signal in a pattern associated with a source or group of sources to distinguish that source or group from other sources. This pattern of time scale changes can be detected by, for example, synchronizing with a chip sequence. For example, a search for a correlation peak of the chip sequence at different time scales indicates that time scale shift relative to a known time scale at which the chip sequence was encoded.

In a content fingerprint approach, the receiver uses content fingerprinting to identify the source. For a particular implementation, there is a well defined set of possible clips that will be used for a localization scheme, and each is registered in a content fingerprint database. Sound segments captured in the receiver are processed to derive fingerprints (e.g., a robust hash or vector of features) that are then matched against the registered fingerprints in the database. The matching fingerprint in the database indicates the source.

In an implementation using synthesized audio, each loudspeaker plays specially designed audio clip that sounds pleasant to the ear but carries the hidden payload—maybe by slight adjustment of the frequencies on a MIDI sequence or shaping a watermark signal to sound like ocean waves or fountain sounds. As noted, watermark signals can be generated that sound like the output a white noise generator used in sound masking systems, or have are designed for optimal embedding in a host white noise source signal from a white noise generator of a sound masking system.

The closest source can be identified based on its unique identifier, using any of the identifications schemes above. It may also be determined using strength of signal analyses. One particular analysis using watermarks is to encode watermarks at successively different strengths and then determine the closest source as the one in which the weakest of these watermarks is detected.

When two or more sources can be detected in the audio captured at the mobile device, forms of triangulation based positioning can be performed using estimates of direction or distance of the mobile devices relative to the sources.

Ambient Capture

Previously, we outlined techniques for uniquely identifying the source by generating source signals that can be identified in the receiver. This application requires design of signaling techniques that do not degrade the quality of the background sound and yet are reliably detected from ambient sound captured through a mobile device's microphone.

Figure 3:
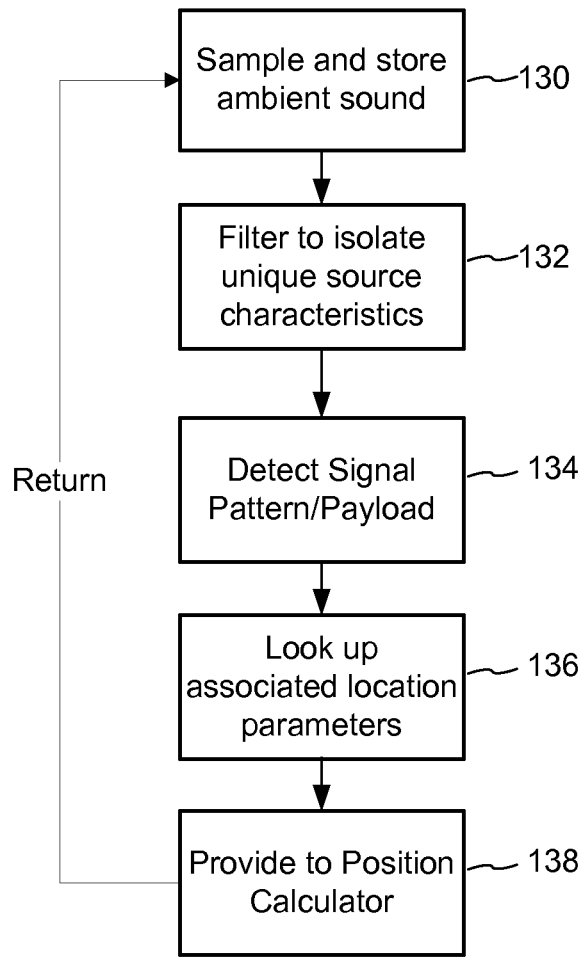
FIG. 3 is a flow diagram of a process for analyzing an ambient audio signal to detect and identify an audio source signal.

FIG. 3 is a flow diagram of a process for analyzing an ambient audio signal to detect and identify an audio source signal. This process is preferably implemented within the mobile device. However, aspects of the process can be distributed to another device by packaging data for a processing task and sending to another computer or array of computers for processing and return of a result (e.g., to a cloud computing service). In block 130, control of the audio steam captured in the microphone is obtained. The audio stream is digitized and buffered.

In block 132, the buffered audio samples are filtered to isolate modulated feature locations (in the case of a digital watermark or synthetic data signal) or to isolate features of a content fingerprint.

Next, in block 134, a digital watermark decoder analyzes the filtered content to decode one or more watermark signals. As explained previously, encoded data is modulated onto features by modifying the features. This modulation is demodulated from features to produce estimates of the encoded data signal. These estimates are accumulated over a detection window to improve signal detection. The inverse of the data encoding provides a payload, comprising an identifier. For example, one embodiment mentioned above uses a spread spectrum carrier and convolution codes to encode a first watermark layer. In one implementation, the first layer conveys a 32 bit payload and a 24 bit CRC computed from the 32 bit payload. The combined 56 bits are encoded with a one-third rate convolution encoder to generate 168 encoded bits. Each of these bits modulates a 100 chip carrier signal in a DSSS protocol. The 100 chip sequence are mapped sequentially in time, with each chip mapping to 2-3 audio samples at 16 KHz sample rate.

The detector demodulates the carrier signal which provides a weighted bit estimate. A soft error correction decoder uses a Viterbi decoder for convolution decoding of a payload of data symbols. The demodulation is implemented as a sliding correlator that extracts chip estimates. These chip estimates are weighted by a correlation metric and input to the Viterbi decoder, which in turn, produces a 56 bit decoded output. If the CRC succeeds, the first layer identifier is deemed detected. If not, the sliding correlator shifts and repeats the process. This first robust watermark layer provides a source identifier, identifying at least the network neighborhood in which the receiving device is located.

A second layer detector then operates portions of audio from which the first layer was successfully detected and decodes a second layer identifier, if present. This detector applies an echo or frequency tone detector, for example, using the approach described previously. The autocorrelation detector, for instance, takes a low pass filtered version of the audio, and then executes a shift, multiply and add to compute autocorrelation for pre-determined delays. A Cepstral based detector computes the Cepstrum of frames of input audio, and combines the result to extract the echo profile. In particular, one implementation combines by computing an average of the Cepstrum from each frame to extract an echo profile, and then matches the extracted echo profile with a set of echo profiles corresponding to data symbols to identify data symbols that are embedded. For added robustness, these data symbols, in turn, are decoded further using symbol decoding techniques, like error correction, error checking, etc. to provide a data message, including identifying information, like a source ID, location coordinates, pointer to source metadata, etc.

For content fingerprints, the features are hashed into a feature vector that is matched with pre-registered feature vectors in a database. For an application of this type, the library of unique content fingerprints is relatively small and can be stored locally. If necessary, however, the fingerprint matching can be done remotely, with the remote service executed on a server returning the source identifier of the matching source signal.

The source identifier obtained from processing block 134 is used to look up the associated location parameters for the source. If two or more source identifiers are detected, a further analysis is done on detection metrics to estimate which is the dominant source. The source identifier with the stronger detection metrics is identified as the closest source.

Figure 4:
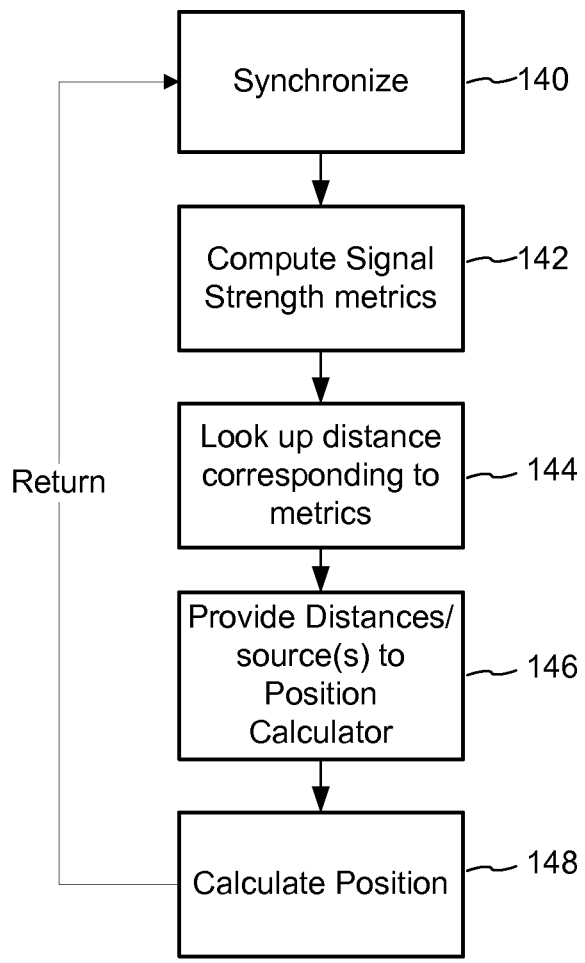
FIG. 4 is a flow diagram of a process for determining distance from an audio source signal by analyzing strength of signal metrics.

FIG. 4 is a flow diagram of a process for determining distance from an audio source signal by analyzing strength of signal metrics. This process is designed to follow initial detection of a source signal, such as the process of FIG. 3. In block 140, the detection of a robust signal layer provides a frame of reference within the buffered audio in the device to make more granular assessments of weak watermark data. For example, the block boundaries of the chip sequences for which the first layer payload is successfully detected provide synchronization for further operations. In block 142, signal metrics are computed. One metric is a correlation metric in which the detected watermark's encoded data signal is re-generated after error correction and then compared with the input to the soft decision decoder. This comparison provides a measure of correlation strength between the expected signal and the extracted signal prior to error correction. This approach allows the payload to provide a source identifier, and the strength metric to provide an estimate of distance from the source. The correlation strength metric may be further refined by measuring the encoded source signal energy at particular frequencies, and providing a series of signal strength metrics at these frequencies. For instance, frequency components of the first layer or a separate second layer are distinctly measured. One signal strength metric based on these measurements is to compute a ratio of encoded data signal strength at low frequency feature locations to higher frequency feature locations. This particular metric can be derived from a special purpose watermark signal layer that is designed to estimate distance from source. Alternatively, the modulation of frequency tones can provide the source identifier, and the strength ratios computed between high and low frequency components of distinct watermarks provide the strength metric. In both cases, as distance increases from the source, the strength metric decreases.

In block 144, the detection metrics are used to look up distance estimates. In block 146, the source identifiers and associated detection metrics are supplied to a position calculator. The position calculator looks up location of the sources from the source IDs and then enters location and distance parameters and solves for an estimate of position of the mobile device location. To simplify the calculation, the solution set is reduced to a set of discrete locations in the network. The position is determined be finding the solution that intersects the position of these discrete locations.

Figure 5:
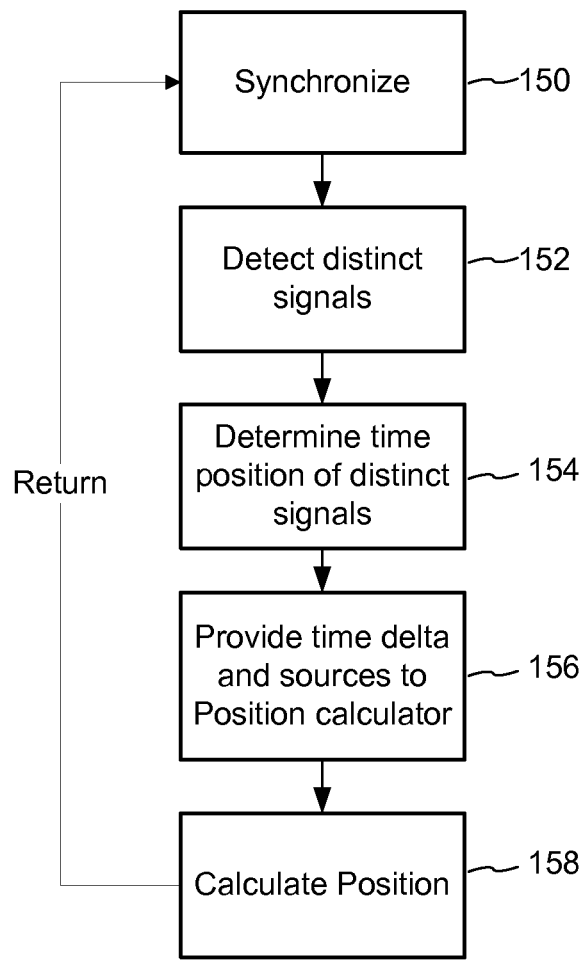
FIG. 5 is a flow diagram of a process for determining the time difference of arrival of audio signals from distinct audio sources.

FIG. 5 is a flow diagram of a process for determining the time difference of arrival of audio signals from distinct audio sources. In one implementation, the detector measures the difference in arrival time of distinct source signals that are encoded using the DSSS data signal approach described previously. For this implementation, we select a chip sequence length based on the spacing of nodes in the positioning network. In particular, we choose a length of chip sequence at least equal to the largest delay between source signal arrivals that we expect. If the maximum speaker distance is 50 feet, then the maximum difference in distance from source 1 to source 2 is around 50 feet. At a sample rate of 16 kHz, the chip sequence should be at least 800 samples.

In block 150, the detector executes a search for the encoded data signals. For the DSSS data encoding protocol, the detector executes a slide, correlate, and trial decode process to detect a valid watermark payload. In block 152, it then seeks to differentiate source signals from different sources. This differentiation is provided by the unique payloads and/or unique signal characteristics of the source signals.

In block 154, the detector measures the time difference between one or more pairs of distinct signal sources. The identifier and time differences for a pair of distinct source signals received at the device is then provided to a position calculator in block 156.

In block 158, a position calculator uses the data to estimate the mobile device position. It uses the TDOA approach outlined previously.

We have described alternative approaches for integrating audio positioning signals into an audio sound system to calculate position of a mobile device from analysis of the source signal or signals captured through the microphone of the device. These approaches can be used in various configurations and combinations to provide position and navigation at the mobile device. There are a variety of enhancements that can be used without interfering with the primary function of the audio playback equipment to provide background and public address programming.

An enhancement is to adapt watermark strength based on sensing the ambient sound level. As ambient sound level increases, the watermark signal is increased accordingly to stay within the higher masking threshold afforded by the ambient sound.

Another enhancement is to provide the host signal sets to the receiver, which is then used to do non-blind watermark detection. In such detection, the knowledge of the host signal is used to increase recoverability of the encoded data. For example, it can be used to remove host signal interference in cases where the host signal interferes with the watermark signal. As another example, it can be used to ascertain content dependent parameters of the watermark encoding, such as the gain applied to the watermark signal based on the host signal characteristics.

Another enhancement is to model the room acoustics for a particular neighborhood of speakers in the location network, and then use this model to enable reversal of room acoustic effects for audio captured by receivers in that neighborhood.

The range of the loudspeakers is limited, so triangulation may not always be necessary to deduce location of the mobile device. One can infer proximity information from just one loud-speaker.

A combination of fragile and robust watermarks can be used—at farther distances, fragile watermarks will not be recovered, which provides an indicator of distance from a source. Source signals are encoded with a primary identifier in a first layer, and then additional secondary layers, each at robustness level (e.g., amplitude or frequency band) that becomes undetectable as distance from the source increases.

Additionally, multiple phones in the same neighborhood can communicate with each other (e.g., using Wi-Fi protocols or Bluetooth protocols) and exchange information based on relative positioning.

Various aspects of the above techniques are applicable to different types of source signals that are detectable on mobile devices, such as mobile telephones. For example, mobile phones are equipped with other types of sensors that can detect source signals corresponding to network locations, such as RFID or NFC signals.

Figure 6:
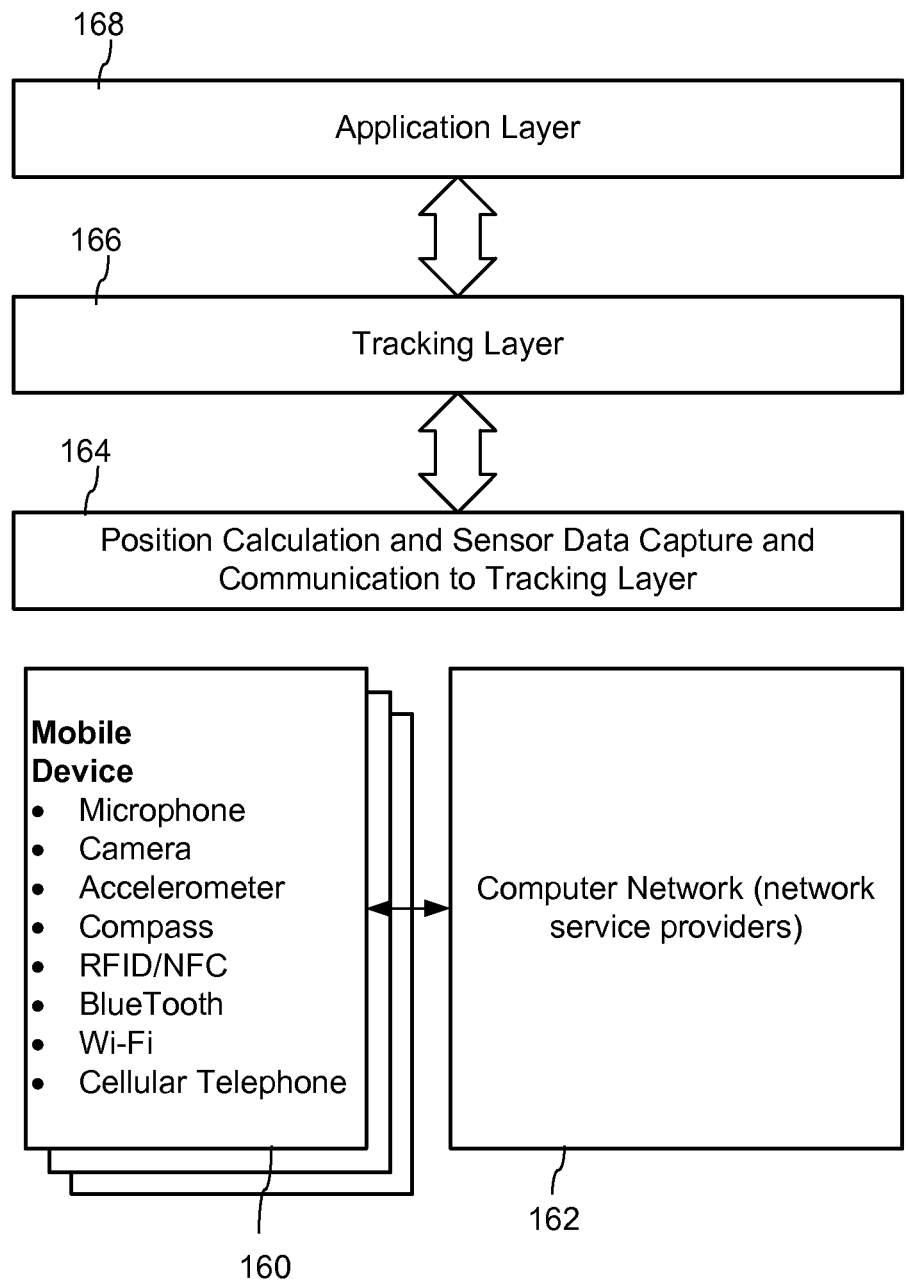
FIG. 6 is a diagram illustrating a system architecture for building application programs on top of a location based services platform for mobile device networks.

FIG. 6 is a diagram illustrating a system architecture for building application services on a positioning system. The hardware layer is comprised of the mobile devices 160 of the end-users and a computer network 162. From the perspective of a user's device, the computer network includes a network of servers and other peer devices that provide additional computing resources, memory, and means to capture additional location and context data that feeds intelligence into the system by leveraging the sensors of other mobile devices and also offloads computing resources and power consumption from mobile devices to servers (e.g., "cloud" computing services). The peer mobile devices have sensors, like microphones, cameras, accelerometers, etc. They also have mobile Operating Systems (OS) to provide basic operating functions on the device, like memory management, task management, etc. as well as Application Programming Interfaces (APIs) for providing programmatic access to sensors and the data streams that come from these sensors on the device.

Above this hardware level, a position services software layer 164 resides. This layer is distributed across the network of peer mobile devices and servers. As described in more detail above, positioning services software residing on the mobile device captures data from the sensors through the mobile OS and operates in conjunction with server software to calculate mobile device position. It also provides session information to the tracking layer to start and end a tracking session for a mobile device.

The tracking layer 166 sits above the basic services layer and manages sessions of a mobile device. It registers a session ID for a device and tracks position and other related sensor data from the device and correlates it to the session ID and a device ID.

The application layer 168 is a set of application programs that uses the tracking layer and basic services passed through from layer 164 to provide location based applications. All three layers 164-168 are depicted as residing in part on the mobile device peer devices 160 and the computer network 162, as they are distributed applications.

Additional Sensors on the Mobile Device

As noted above, sensors other than the microphone on the mobile device can be used to assist in providing location and navigation information. These include an accelerometer, compass/magnetometer, gyroscope, camera, RFID devices, and satellite based GPS, now commonly included in smartphones. The accelerometer or gyroscope, such as those provided in smartphones and video game controllers, provides an orientation of a mobile device. The magnetometer provides an orientation like a compass by sensing magnetic field.

The camera provides both still image and video stream capture that contributes to positioning, navigation and other location based services in a variety of ways. Both the still and video capture enable the device to read digital data encoded in surrounding objects, such as digital watermarks or bar codes. This digital data provides identification of the objects. In turn, this identification can be referenced in a database to provide associated information about the object itself as well as its context, such as its location and local 2D and 3D maps for navigation and related User Interface (UI) services providing feedback on location, orientation, Augmented Reality (AR), etc. In addition to providing digital data, machine readable symbologies also provide orientation information. In particular, the system derives orientation of the mobile device by calculating the orientation of the machine readable symbology on fixed surface, such as a store wall or shelf wall, floor or ceiling.

The still and video image captured on the device also image recognition applications. Such applications including identifying neighboring objects, like products, floor/ceiling and wall patterns, etc., from the unique imagery (e.g., logos, textures, graphics) on the neighboring objects. Another application is to derive orientation information by tracking image features in image frames to detect surfaces, such as a planar surface like the wall, floor or ceiling from which a geometric frame of reference can be computed. For example, image feature recognition is used to identify image features on a substantially planar surface. The location of these features are then tracked over time by detecting them in a series of video frames from the video camera on the smartphone. Orientation parameters of the surface are derived from the feature locations to provide a frame of reference of the smartphone position and orientation relative to the surface. Examples of features include robust features calculated using Scale Invariant Feature Transforms (SIFT) and variants, including those referred to as Speeded Up Robust Features (SURF). This frame of reference enables UI services like AR-type displays where synthetic graphics of selected UI items are superimposed in a geometric frame of reference over the video stream captured by the device or a 3D synthetic representation of neighboring shelves and other objects.

Another capability enabled by image capture on the mobile device is the ability to read time varying data signaling in surrounding light sources. The camera on the mobile device enables the system to read and decode signals conveyed in facility or object lighting (e.g., LED-based light signaling), video displays (including displays of other smartphones), store lighting, product displays, etc. Time varying digital data signals can be conveyed to the mobile device by modulating the lighting device output with a digital data stream. Video displays deployed in stores can provide machine readable links to promotions by displaying digitally watermarked images with embedded links or bar codes with links encoded in the bar code data.

While the microphone is primarily used for sensing audio sources for positioning in the above-described positioning systems, it can also be used to decode watermark information referencing product information, in-store promotions, or system commands to the tracking or application layers of the system.

Additional wireless device sensors, like RFID readers (including Near Field Communication (NFC) devices, Wi-Fi and BlueTooth interfaces on mobile devices provide additional data to enhance the system. These include identifying neighboring objects, like other data carriers conveyed through image or audio signaling, and also providing a communication channel to convey position and timing signal among devices in the network.

In addition to sensors that capture input from the surrounding physical environment or motion of the device, the computing platform of the mobile device also includes logical inputs that maintain user context information, such as user profile and preferences, transaction history, calendar, etc. In particular, both the purchase and search transaction history and calendar on the user's smartphone system provide a proxy for user preferences and user context by enabling preferences to be inferred from prior transactions and the user's calendar, which indicates user context like time, place, related contact information and subject descriptor.

Tracking Layer

Above, we outline several methods for processing position and related data (audio source signals, orientation data from sensors) captured on the handset to provide services to the user of the mobile device as well as to system operators and other constituents. The introduction of a tracking layer in the system not only improves the accuracy of the core function of calculating device position, but also enables additional services provided through an application layer built on the tracking of data over time. The tracking layer is a set of methods implemented within the system (e.g., on the mobile devices and supporting network computing environment (the "cloud") to record and interpolate the positions from mobile devices and provide a continuous path of the mobile devices, augmented with additional information, such as velocity, direction of motion, etc. This data of position detection events and sensor feeds from mobile devices is used to enhance the accuracy and robustness of the system, and provide position, orientation, continuous path, velocity, acceleration, object identification and other tracking information to application programs in the application layer through a tracking layer API. The application layer users the services of the tracking layer to build applications, like device navigation, shopping applications (shopping guides, comparison shopping, promotion and coupon redemption, electronic purchase from mobile device, etc.), location based search services, location based messaging and social networking, market intelligence gathering, etc.

The tracking layer is a network application implemented on one or more server systems in communication with the mobile devices in a network. In any given application, mobile devices enter and exit a network over a navigation session, during which the tracking layer logs in the device and captures data from the device for the session. This data includes the data captured from the microphone, as well as other sensors on the device, like the accelerometer, magnetometer, and/or gyroscope providing device orientation, camera providing captured images, GPS providing broader location context (e.g., launching an in-store mobile application on the user's smart phone when the user arrives at a store or mall associated with that in-store application), etc.

Within a session, the tracking layer analyzes the variations in position and orientation data of the mobile device in that session and derives further information for location based services, such as velocity (device speed and direction). From this information, it predicts user motion, detects and removes outliers in the data, and provides feedback to the user device to improve the accuracy of calculations based on data captured from the device.

For example, in the system described above that determines position of a mobile device as the location of an audio source in the range of its microphone, there is ambiguity when the mobile device is at the boundary between neighboring sound sources. As the mobile device travels between the neighborhoods of sources, its microphone captures sounds from two sources, creating an ambiguity. The tracking layer in the system uses detection metrics to assess which source signal is more reliable, and thus, corresponding to the closer source. It also uses the detection metrics to implement system messaging services, which enable programs in the application layer call these services to provide feedback messages in the smartphone UI. Thus UI guides the user on how to use the device (e.g., direction to point it, or how to steady it or initialize it for a session), or where to move (move slowly forward down the aisle). By tracking the user's location and orientation over time, the tracking layer predicts the direction of a nearby source and provide direction prediction services to the application layer, which uses these services to guide the user there through feedback on the device (e.g., simple output message on the display or audio output prompting the user to move forward or backward along a shopping aisle).

Beyond dealing with ambiguities and pruning or filtering outliers in the data, the tracking layer calculates velocity (speed and direction) and acceleration of the device and provides this information for applications that use it to provide navigation services. For this service, the tracking layer predicts the position of the device over time, thus producing a continuous a path of the device (e.g., interpolates a path through the position points over time). Detail about the user's orientation and movement is derived using orientation data over time from the accelerometer and magnetometer, filtering the data to smooth outliers, and plotting trajectory of the device from the filtered data.

Application Layer

The application layer is a layer of software programming that uses the tracking layer to provide a software application to a user. This application may be an application that runs, at least in part, on the user's device and interacts with tracking layer services to provide services for the user. It may also be an application that runs primarily at the system or server side, providing services to businesses, like market intelligence data gathering and reporting. In the next sections, we describe a variety of navigation related applications for the application layer.

Navigation

Navigation applications use basic position information and additional information on movement, orientation and direction of the device from the tracking layer to provide navigation services. Navigation applications include applications that guide a user of the device to a destination or series of destinations. These destinations can be entered interactively by the user, derived based on other user inputs, and/or generated dynamically during a user session from context data or inferences drawn from the context data.

Since the above positioning technology is particularly adapted for indoor positioning applications, some of the most useful navigation applications relate to facilitating the user's shopping experience within a large store or shopping mall. One such application is a guided shopping experience built on navigation services of the system.

FIGS. 7-10 are flow diagrams illustrating an example of a navigation application tailored for shopping. In addition to the particular processing flow illustrated in these diagrams, we will also describe a variety of alternative process modules and sequences that differ from it. The processing modules and sequence of operations can be rearranged and augmented with other features, and these are simply representative examples.

Figure 7:
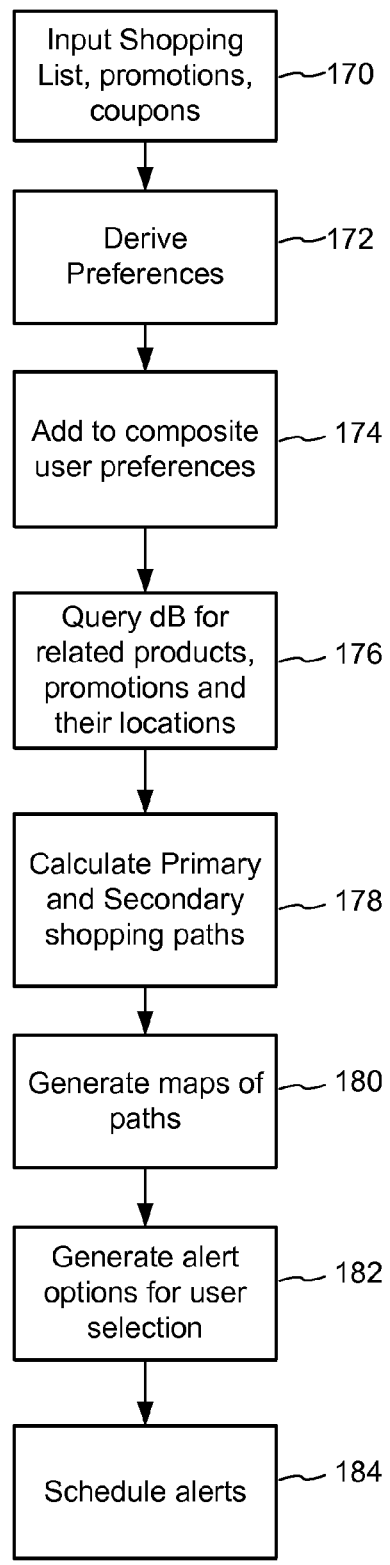
FIG. 7 is a flow diagram illustrating an initial data gathering and trip planning stage of a navigation application.

FIG. 7 is a flow diagram illustrating an initial data gathering and trip planning stage of a navigation application. Block 170 depicts the data gathering process in which the preferences are supplied directly by the user and derived from other inputs. Direct inputs include the items on the user's shopping list, which may be facilitated by drop down menus and search interface options, organized by store, product category, etc. Indirect inputs are derived from various sources. One source is a promotion or coupon, which is sent to the system electronically, e.g., through a promotion service like Groupon or LivingSocial. Another is through the user scanning coupon's from a product or display using the smartphone camera.

Another source of inputs is from messages posted to the system from messaging applications, like email, text, social networking applications (e.g., posts to FaceBook, Twitter, FourSquare accounts). This type of input addresses typical ways family and friends often shop: family members give shopping lists and suggestions to other family members, friends recommend products that other friends might like, children send gift lists to parents, etc. To support this messaging, the application has a messaging interface that enables it to read product postings in various forms, whether they be sent by email, text messaging, post to social networking service (e.g., Facebook, Twitter, etc.). Additional input from friends, like the text of the recommendation, or audio/video clip may also be posted, captured by the system and logged for playback as an alert message to the shopper at the relevant time and place during the shopping trip.

Block 172 represents the process of deriving preferences from the various forms of user data gathered previously. This includes the shopping list compiled from direct and indirect inputs, as well as prior user shopping history stored in the application. Further preferences can be derived by inferring preferences from other application history, such as search history, user calendar, user's social network application preference settings, etc.

Block 174 represents the process of compiling a composite set of preferences based on the information gathered in the previous steps. The user can, of course, be offered the opportunity to select operating modes where certain types of preferences are used, or not, by selecting the types of sources the application has access to. Once complete, the application queries a database for a shopping venue (e.g., store, mall, or group of stores in a particular area on the user's favorites list) as shown in block 176. This query returns products matching the user's preferences and their associated locations. Any promotional offers that a store operator has entered in the system for the user's preferred items or related items are returned. The user at this stage can be prompted for interest level in certain products, product categories or promotions.

Next, block 178 represents the process of computing shopping paths from for a store or set of stores of interest to the user. Primary and secondary paths are computed based on the user's interest in either only shopping for items he/she has selected (Primary path), or for additional items that might be interest based on promotions from the store operator or related products that might be of interest based on their relationship to the items that the user has entered directly (Secondary path). The paths are computed based on product locations for each path, and a map of these items within the store. The primary path is computed to provide an efficient travel path for the items associated with that path. The secondary paths provide an opportunity for the store operator to give the shopper additional options for other products and promotions in the store.

Block 180 represents the process of generating a map of the path, which is a graphical depiction of the path in the context of a store map (e.g., a floor plan map). This graphical depiction provides a means to inform the user of the available options in advance and during a shopping trip. The user can view primary and secondary paths, zoom in on and select or un-select items or promotions indicated on the path. Once the user has accepted a path or paths of interest, the application generates a set of alert options corresponding to the selected products, promotions, message posts by others, etc. as shown in block 182. The application provides a UI for the user to review the alert options, view them, and add/delete reminders. This UI can be invoked in advance as well as during a shopping trip to update the alert set as described further below.

Once accepted by the user, including any default acceptance pre-set by the user, the application schedules the alerts as shown in block 184. The scheduling process places the alerts in a queue that indexes each alert by location so that the application triggers an alert from the queue when the user's location matches the location of a queued alert. The application provides the user with UI to access the queue and review scheduled alerts, playback the alerts (including related text, video or audio messages from the system or friends), and update them as appropriate.

Figure 8:
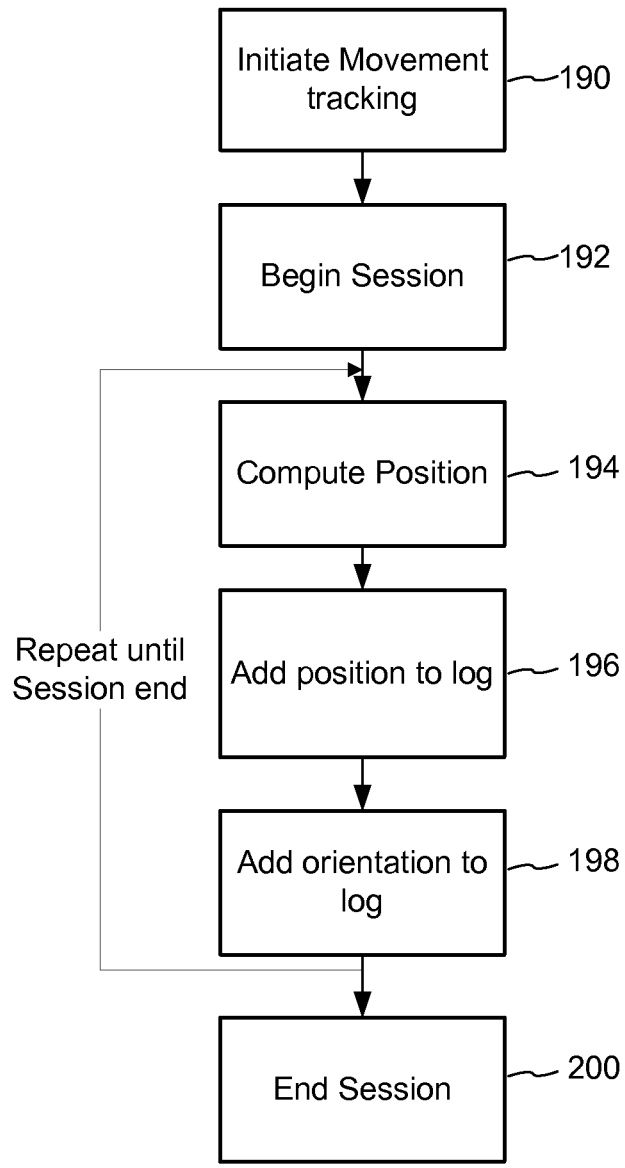
FIG. 8 is a flow diagram illustrating a process for tracking movement of a mobile device during a navigation session.

FIG. 8 is a flow diagram illustrating a process for tracking movement of a mobile device during a session. This process can be implemented using a combination of basic positioning services (e.g., layer 164 in FIG. 6), tracking services (e.g., tracking layer 166 in FIG. 6), and application programs running at the application layer 168. In this example, the position services compute device position, and the tracking layer tracks the movement of a mobile device during a session. The process can be initiated (block 190) automatically when certain system detected events occur, manually, when the user launches the process through the application program's UI (e.g., when he arrives at a store where location based shopping services are enabled), or a hybrid of manual and computer automated trigger where the system alerts the user that navigation services are available and automatically launches the navigation application, and in response, the user opts in, selects a desired path or paths and initiates the navigation session. The start of this movement tracking process begins a tracking session, in which the tracking layer tracks the movement of a mobile device for a session as shown in block 192.

During the session, the application program in control of the session issues a call to the system to turn on sensors used to determine position and orientation of the device. In the case of this example smart phone application, the microphone is used to sense ambient audio. As shown in block 194, the position services layer computes position by detecting the audio source as described in the techniques detailed above. The tracking layer logs the position data as shown in block 196. As referenced in block 198, it also logs the orientation data captured from the device (specially, device orientation from accelerator, compass, and/or gyroscope) and velocity derived from a history of position data calculated over time. The processing in blocks 194-198 continues until the session ends in block 200. The end of the session, like its beginning, can be triggered automatically (e.g., when the device leaves the current venue) or by the user through the application UI.

Figure 9:
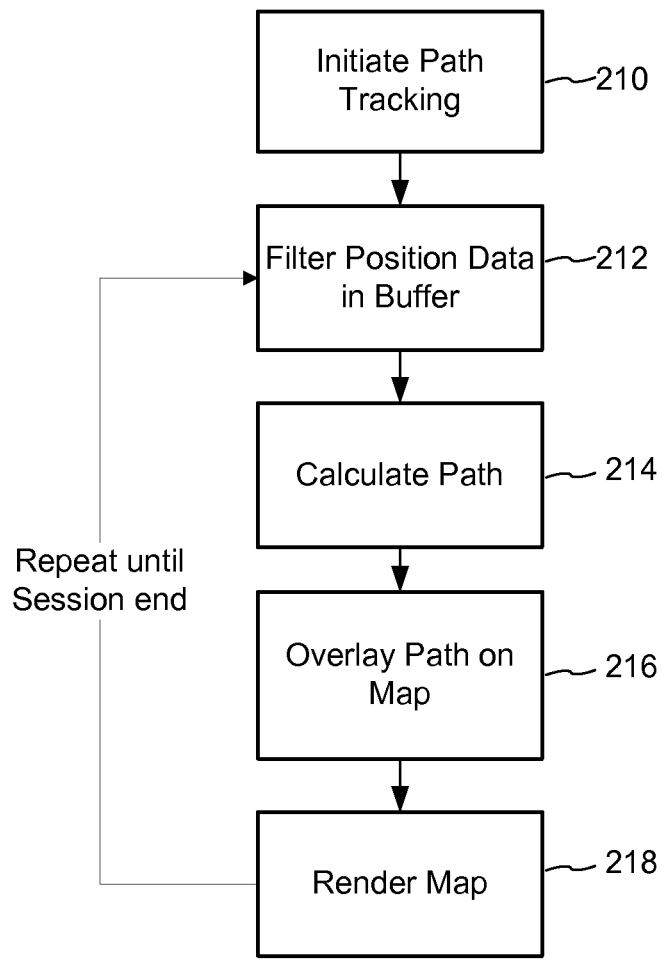
FIG. 9 is flow diagram illustrating an example of a path tracking process for navigation applications.
Figure 10:
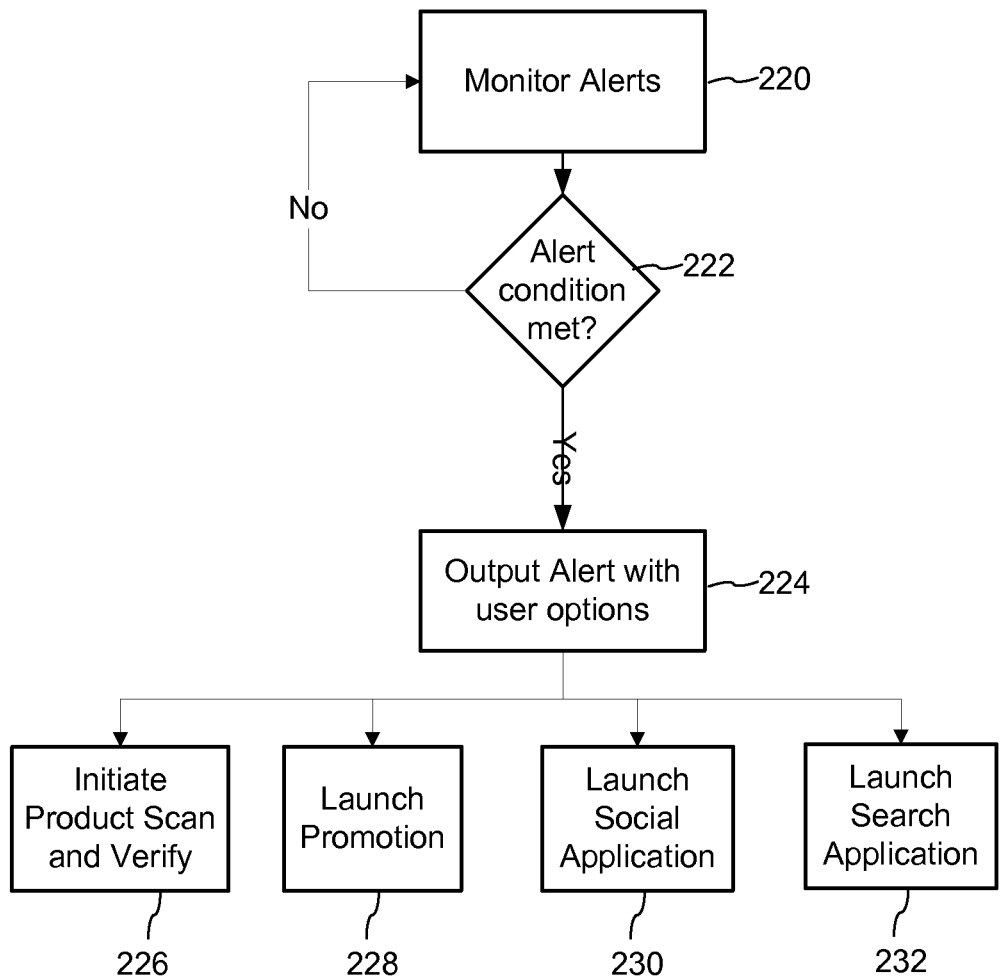
FIG. 10 is flow diagram illustrating a process for managing alerts in a navigation application.

The movement tracking process provides a history of location, orientation and movement (velocity, acceleration) of a mobile device from which additional services are provided. FIGS. 9 and 10 are examples of these additional services.

FIG. 9 is flow diagram illustrating an example of a path tracking process. This process is provided by the tracking layer in conjunction with a navigation application. In this example, the tracking of the user's movement is used to calculate the user's real time path during a session. The path tracking services is initiated at the beginning of a session as shown in block 210. In block 212, the tracking layer filters position and orientation data in the most recent time window to remove outliers and smooth the data. It then calculates a real time path through the position data as shown in block 214. This real time path calculation involves fitting a curve to the filtered data.

The real time path, in turn, is provided to an application layer to provide navigation guidance. One such example, depicted in the processing flow in blocks 216-218, is to overlay the path on a floor map of the shopping venue and then render that map in a UI display of the mobile device to show the user position and movement relative to merchandise displays, walls, and other objects in the shopping venue. The specifics of the depiction of this path are a matter of UI design of the application, and many alternative UI features are possible.

For example, the path may be superimposed over a 2D or 3D floor map, optionally enhanced with AR type features, and displayed relative to the optimal path calculated in a process like FIG. 7. In one UI configuration, the application UI enables the user to select from among the shopping paths calculated in FIG. 7. The user can then switch the application to autonomous mode, where it gives varying levels of alerts while docked in a cradle, to guide the user along a selected path and/or issue an alert when scheduled alert conditions are met. Alternatively, the user can switch the application into interactive mode where the user can view his path relative to the pre-computed path rendered on the display of the smartphone.

To save power consumption on a mobile handset, the rendering may be limited to specific user request for the display, with visual/audio/tactile (device vibration) alerts provided only when alert conditions are met. Instead of displaying the path, synthesized speech output can be used to provide guidance in response to system alerts that are triggered when the system detects that the user has strayed from a selected shopping path.

Smartphones parked in the cradle of a shopping cart can be switched into a camera mode to support additional UI, object recognition and data reading features. In one configuration, for example, the smartphone is docked in the cradle so that the forward facing camera captures video of the objects within the store in front of the cart. The degrees of motion freedom for the cradle can be limited so that the phone will correctly point forward or laterally facing product shelves. Input from the mobile device's camera provides not only images of the surrounding environment, but also, a stream of image frames from which the orientation of neighboring objects can be derived to construct an augmented reality display of the neighboring objects, surfaces (e.g., the floor, ceiling and merchandise shelves).

Whether the UI display includes a synthetically generated graphics of a map, AR features mixing captured video with graphical elements, or some combination of both, it can be further populated with graphical depictions corresponding to products or promotions corresponding to the merchandise located in the portion of the store depicted on the UI. As noted, many alternative configurations are possible, and we will return to this UI concept in the context of a series of example application program features for managing alerts.

FIG. 10 is flow diagram illustrating a process for managing alerts in a navigation application. As described previously, the alerts are derived from several different sources, some calculated in advance from shopping lists and messaging applications, and others calculated from preferences the same way as described in connection with FIG. 7, yet done so dynamically based on the user's dynamic context in the store, in which user preferences are updated dynamically in real time in response to changing conditions detected automatically or input by the user or his friends during the session at the store. Dynamic context is driven by inputs such as the user's reaction to in-store promotions, contests, etc. pushed to the user during a visit, messages received from others (e.g., from last minute reminder to pick up an item, or updates posted to a social networking service account). It also updated based on items that the user pulls from a menu of options on the shopping application while browsing the shopping options at the store. As new alerts are entered, either from push or pull type alert generation, they are added to the alert queue and scheduled, all indexed to locations within the store.

Referring to FIG. 10, the navigation application monitors the alerts during a session as shown in block 220. This can be implemented by issuing a periodically updated queue to the tracking layer, which in turn, monitors the conditions for triggering an alert based on tracking the user's specific location and macro location in a region in the store (e.g., is the shopper just entering the building, standing at customer service, browsing the aisles, or waiting for check out?). Alerts are triggered based on other sensed context as well as in response to immediate requests from other programmatic processes that interface with the application through messaging applications or other mobile OS level events.

When alert condition is met as depicted generally in decision block 222, the application outputs the alert. While the details of the UI can vary, the alert is preferably output according to user preference (display, vibration, and/or audio message) and with additional user options: re-compute path, play message (video or audio from a friend, promotional video of product, instructional video demonstrating a product's operation, etc.), manage alerts (delete, postpone, respond, etc.) or launch any number of other related mobile applications on the user's device.

The possibilities for launching applications from alerts are quite numerous. In blocks 226-232, FIG. 10 identifies a few examples of applications launched through location and context based alerts. One application is to initiate a product verifier application 226, which helps the shopper verify that the product the shopper has selected matches the one specified in the shopping list and highlighted in the alert, triggered when the shopper arrives at the product's location in the store. This application uses the camera of the user's mobile device to read a bar code or recognize the product package and verify the match. Additional shopping efficiency enhancing features can be added to this application as well, such as tabulating the sum of prices of items in the shopping cart, showing progress of items obtained against the shopping list, showing savings obtained by applying coupons or promotions offered, accelerating check out by communicating the items in the cart to the store's Point of Sale payment network or back office computing system, electronic payment, etc.

Another example is a promotion application 228, which is a mobile application designed to promote a product, either one that the user has on her list, or related to another product on the list, or one that the store seeks to provide to reward the shopper based on derived context from the shopper and the shopper's session context. This context is derived by observing from the session history that shopper has visited several locations within the store, and/or has expressed interest in certain products, (e.g., by sampling information about products using the smartphone sensors). In this example, the shopper's location or other shopper context causes a promotional alert to be scheduled at particular place or in predetermined scenario within the store (e.g., the elapsed time and/or product interest derived in part from tracking movement history). Knowing the traffic patterns of its shoppers, the store operator can design an array of promotions to reward shopper activity discerned from the tracking session.

The context for promotional alerts can also be driven by the collective monitoring of shopping activity in the store as determined through the tracking sessions. Alerts can be generated to serve a particular flow of traffic detected at a particular location, or to drive traffic to other locations that not being visited as reflected in the aggregated session logs.

While the monitoring of the shopper's session is subject to user selectable privacy limits (e.g., opt in tracking with promotional incentives for doing so), the data gathered from the mobile device positioning system can be augmented with other in store traffic monitoring so that even if the user seeks to keep his shopping session private, the store can still monitor traffic patterns anonymously. Traffic monitoring can be performed with other types of sensors, such as optical, audio or pressure sensors, to detect and measure traffic flow through the aisles of the store. One such sensor network is a fiber optic cable network that senses vibrations from user's walking on the store floor, characterizes it based a signal recognition process, and then aggregates recognition events into traffic pattern data. A fiber optic sensor network and signal characterization system is described in: F. Blackmon and J. Pollock, "Blue Rose Perimeter Defense and Security System," Technologies for Homeland Security and Homeland Defense V, Proceedings of SPIE, Volume 6201, pp. 620123, 2006, which is hereby incorporated by reference. To implement this type of sensor system in a mall or store, a sensor network comprised of optical fibers are installed in the floor of the venue. The optical fibers, through Rayleigh optical scattering, sense sound pressure transmitted by shoppers walking on the floor. The sensed signals, which have audio like properties, are captured from an optical receiver, converted to digital signals, which are then supplied to a signal recognition program executing on a computer. The signal recognition program detects signal patterns correlated to a person walking on the floor, and provides detection events that are aggregated into a measure of foot traffic.

If the user does not opt to use his smartphone for shopping, carts can be enabled with dedicated mobile devices that have similar functionality.

Another example application triggered by local context driven alert is a social networking application 230. In this case, the user's in store context triggers an alert related to a social networking service registered in the social networking application accounts on the smartphone. As noted earlier, this alert may be recommendations provided by friends for items in the store. When the shopper arrives at the location of one of these items, the social application launches and presents the recommendations of the user's friends. The alerts may also be generated by the shopper and other shoppers. Not only can shoppers receive alerts from a social networking service triggered by in store context, they may also post messages to a social network by tagging particular products or store display offerings. For example, a user can post to a social networking site recommendations or feedback for a product indexed to a particular in-store location (e.g., product ratings, questions about the product, product ideas and uses like recipes, etc.). The social networking site can be location specific to the section of the store, store specific, user specific (the user's own Facebook page or Twitter account). This context based triggering of social network tagging of in store products or store inspired feedback enables the navigation application to induce social interactivity while the user is inspired by the shopping experience. This enables the shopper to share and get feedback immediately from the store operator, other shoppers and friends during the shopping experience that is tied to particular product context in the store. As the social experiences are aggregated by user's tagging social input to products and product locations within a store, the navigation application enhances the shopping experience by alerting the user to this crowd based tagging of others, when the posts of the crowd satisfy alert conditions of the shopper's session (e.g., as derived from a process like the one in FIG. 7).

Preferably, the social tagging of product items is tied back to the inventory management system of the store. The merchandise data base uses relational database management to dynamically update product availability and correlate this availability with product location. Also, as products are moved about the store, a product tagged at one location is dynamically updated in the database with the new product location.

Yet another example is a search application as shown in block 232. This search application can be designed to facilitate searching for product reviews, comparison shopping, product instructional manuals, etc. The navigation application provides location based and shopper session derived context to tailor targeted search engine queries. In the particular case where the alert launches a search application, this search application is provided with in store context for that alert, including the product identity and location (including context of the product display in the store, and the context of the store), related promotion, and the shopper's session history. This enables the search to be tailor the search and its results more effectively.

Cradle Enhancements

As we noted above, a cradle or like form of docking port for the user's smartphone provides a number of features and advantages. It facilitates a hands free autonomous mode of operation. It also fixes the position of the sensors, including the microphone and camera, on a smartphone or other mobile device, relative the shopping cart frame of reference. Another challenge that it addresses is usability. If shoppers do not have a convenient way to interact with mobile applications on their smartphones as they shop, they are less likely to use them. By making it easier for users to interact with the device, they are more likely to use it.

Usability is further increased by adding features and components that entice users to put their devices in the cradle. One component is a battery charger. This addresses both the issue of power consumption while the smartphone is in a continuous listening mode (and or looking mode through the camera) for the positioning application, and provides a user benefit of keeping the device charged. One way to implement the charger is to provide an inductive charging cradle port that supplies power to the device from a battery mounted on shopping cart. The battery acts as a charging station, providing energy through inductive coupling between the port and the mobile device positioned in the port. This cart-mounted battery itself can be charged by either directly plugging the battery into a charging station at a cart stand, or using a more powerful inductive coupling between the cart battery and a second charging station connected to a shopping cart port, where carts are returned when not in use.

The induction chargers use an induction coil to create an alternating electromagnetic field from within a charging base station, and a second induction coil in the portable device takes power from the electromagnetic field and converts it back into electrical current to charge the battery. The two induction coils in proximity combine to form an electrical transformer. In the case of the smartphone cradle, the induction coil is located in the port (e.g., a sleeve) that the smartphone plugs into. The battery is also paired with an induction coil in its housing on the cart, to enable it to be charged by the electromagnetic field emitted by the charging base station in the shopping cart return port.

Concluding Remarks

Having described and illustrated the principles of the technology with reference to specific implementations, it will be recognized that the technology can be implemented in many other, different, forms. To provide a comprehensive disclosure without unduly lengthening the specification, applicants incorporate by reference the patents and patent applications referenced above.

The methods, processes, and systems described above may be implemented in hardware, software or a combination of hardware and software. For example, the signal processing operations for distinguishing among sources and calculating position may be implemented as instructions stored in a memory and executed in a programmable computer (including both software and firmware instructions), implemented as digital logic circuitry in a special purpose digital circuit, or combination of instructions executed in one or more processors and digital logic circuit modules. The methods and processes described above may be implemented in programs executed from a system's memory (a computer readable medium, such as an electronic, optical or magnetic storage device). The methods, instructions and circuitry operate on electronic signals, or signals in other electromagnetic forms. These signals further represent physical signals like image signals captured in image sensors, audio captured in audio sensors, as well as other physical signal types captured in sensors for that type. These electromagnetic signal representations are transformed to different states as detailed above to detect signal attributes, perform pattern recognition and matching, encode and decode digital data signals, calculate relative attributes of source signals from different sources, etc.

The above methods, instructions, and hardware operate on reference and suspect signal components. As signals can be represented as a sum of signal components formed by projecting the signal onto basis functions, the above methods generally apply to a variety of signal types. The Fourier transform, for example, represents a signal as a sum of the signal's projections onto a set of basis functions.

The particular combinations of elements and features in the above-detailed embodiments are exemplary only; the interchanging and substitution of these teachings with other teachings in this and the incorporated-by-reference patents/applications are also contemplated.

We claim:

1. A method for indoor navigation in a venue comprising:
 receiving through a microphone of a mobile device an audio signal, the microphone capturing sound in the venue in a frequency range including a frequency range of human hearing;
 determining a position of the mobile device in the venue based on identification of the audio signal by processing the audio signal to detect distinguishing audio characteristics of similar sounding audio from plural different audio sources, identifying plural different audio sources from the distinguishing audio characteristics, obtaining positions of the different audio sources, and calculating the position of the mobile device based on the positions of the audio sources;
 monitoring the position of the mobile device;
 outputting a position based alert on an output device of the mobile device when the position of the mobile device is within a pre-determined position associated with the position based alert.

2. The method of claim 1 wherein the determining comprises extracting identifying information from the audio signal.

3. The method of claim 1 wherein the audio signal comprises a combination of audio signals captured through the microphone from output of plural different loudspeakers in a configuration of loudspeakers for outputting audio content to humans within an indoor facility.

4. The method of claim 3 wherein the configuration of loudspeakers comprises loudspeakers of a sound masking system.

5. The method of claim 3 wherein the configuration of loudspeakers comprises loudspeakers of a public address system.

6. The method of claim 1 wherein the monitoring comprises tracking position derived from audio signals captured through the microphone of the mobile device; and based on tracking the position, providing feedback on indoor navigation in the venue.

7. The method of claim 6 wherein the feedback comprises a depiction of a continuous path traveled by the mobile device on a map of an area around the mobile device.

8. The method of claim 7 wherein the feedback comprises a depiction of the path traveled relative to a path in the venue computed based on preferences derived from user input.

9. The method of claim 6 wherein the feedback corresponds to location based alerts computed by:
 deriving preferences about products in the venue from input;
 determining locations of the products in the venue;
 and scheduling location based alerts to be triggered when the mobile device is detected to be in proximity of the locations of the products in the venue.

10. The method of claim 9 wherein the deriving comprises identifying the products in a shopping list entered as the input.

11. The method of claim 9 wherein the deriving comprises identifying the products in electronic promotions sent to the user via electronic messaging.

12. The method of claim 9 wherein the deriving comprises identifying the products from electronic messages posted to a social network site associated with the user of the mobile device.

13. The method of claim 9 wherein deriving comprises identifying products from input captured from an image capture of a product coupon or promotion on a mobile device.

14. The method of claim 6 wherein the feedback comprises automated audio messages from the mobile device providing navigation directions while the mobile device is docked in a cradle on a shopping cart.

15. The method of claim 1 including tracking orientation of the mobile device based on sampling orientation data from an orientation sensor on the mobile device.

16. The method of claim 15 including providing a product alert on the mobile device based on position derived from audio capture and orientation from sampling orientation data.

17. The method of claim 1 including monitoring user traffic in the venue and deriving a product alert from the monitoring of the user traffic in the venue.

18. The method of claim 17 wherein the user traffic is monitored through position detection of mobile devices in the venue from audio signals captured on the mobile devices.

19. The method of claim 17 wherein the user traffic is monitored through a fiber optic cable sensor network in the venue.

20. The method of claim 1 including:
making a location based posting to a social network by receiving input from a user on the mobile device relating to a product at a first position, detecting the mobile device location at the first position, and sending a post including the user input and first position to the social network.

21. The method of claim 20 including;
determining when a mobile device is in proximity to the first location, determining whether the location based posting satisfies a preference of the user of the mobile device, and in response to determining that the location based posting satisfies the preference of the user of the mobile device, issuing an alert on the mobile device about the posting at the social network.

22. A system for indoor navigation in a venue comprising:
a configuration of audio sources, each transmitting a uniquely identifiable audio signal corresponding to a location;
one or more computers for receiving audio detection events from mobile devices in the venue, the detection events providing identifying information that distinguishes similar sounds in audio captured through a microphone of a mobile device from different audio sources in the venue and calculating mobile device location from the detection events, monitoring position of the mobile devices at the venue, and sending an alert to the mobile devices when the position of the mobile devices is at a position associated with the alert;
wherein calculating the mobile device location further comprises identifying plural different audio sources from the audio detection events, obtaining positions of the different audio sources, and calculating the position of the mobile device based on the positions of the audio sources.

23. The system of claim 22 wherein the audio sources comprise loudspeakers of a public audio playback system in the venue.

24. The system of claim 23 wherein the public audio playback system comprises a public address system.

25. The system of claim 23 wherein the public audio playback system comprises a sound masking system.

26. The system of claim 22 wherein the mobile devices comprise wireless telephones and the audio detection events are detection events of identifying information in sounds output from speakers in the venue and captured through microphones on the wireless telephones.

27. The system of claim 22 wherein the mobile devices are docked in shopping cart cradles within the venue.

28. The system of claim 27 wherein the mobile devices comprise wireless telephones and the shopping cart cradles include a battery charging station for wireless telephones.

29. The system of claim 22 further including a traffic monitoring system, wherein the traffic monitoring system provides information about traffic in the venue from which position based alerts are generated and sent to the mobile devices in the venue.

30. The system of claim 29 wherein the traffic monitoring system comprises a fiber optic sensor network.

31. A non-transitory computer readable medium, on which is stored instructions, which when executed by a computer, perform a method for indoor navigation comprising:
detecting audio source identifying information from an audio signal captured on a microphone;
providing the source identifying information to a process for computing position of a mobile device in a venue, the source identifying information identifying plural different audio sources from the audio signal captured on the microphone; and
generating a position based alert on an output device of the mobile device when the position of the mobile device is within a pre-determined position associated with the position based alert in the venue;
wherein computing position of the mobile device further comprises detecting distinguishing audio characteristics of similar sounding audio from the plural different audio sources, obtaining positions of the plural different audio sources, and calculating the position of the mobile device based on the positions of the plural different audio sources.

32. The non-transitory computer readable medium of claim 31, where the medium comprises a memory of the mobile device.

33. The non-transitory computer readable medium of claim 32 wherein the mobile device comprises a wireless phone, and the microphone is a microphone of the wireless phone.

34. A non-transitory computer readable medium, on which is stored instructions, which when executed by a computer, perform a method for indoor navigation comprising:
receiving audio source identifying information detected in audio captured from a microphone of a mobile device, the source identifying information identifying plural different audio sources from the audio signal captured on the microphone;
obtaining positions of the different audio sources;
computing position of a mobile device in a venue based on the positions of the audio sources; and
generating a position based alert for output on the mobile device when the position of the mobile device is within a pre-determined position associated with the position based alert in the venue.

35. The non-transitory computer readable medium of claim 34 wherein the computer readable medium comprises memory of a server computer in communication with the mobile device.

* * * * *